(12) United States Patent
Suzuki et al.

(10) Patent No.: US 10,038,295 B2
(45) Date of Patent: Jul. 31, 2018

(54) GAS LASER APPARATUS

(71) Applicant: Gigaphoton Inc., Tochigi (JP)

(72) Inventors: Natsushi Suzuki, Oyama (JP); Osamu Wakabayashi, Oyama (JP); Hiroaki Tsushima, Oyama (JP); Masanori Yashiro, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/631,676

(22) Filed: Jun. 23, 2017

(65) Prior Publication Data

US 2017/0288361 A1 Oct. 5, 2017

Related U.S. Application Data

(60) Division of application No. 15/145,016, filed on May 3, 2016, now Pat. No. 9,722,384, which is a
(Continued)

(30) Foreign Application Priority Data

Nov. 25, 2013 (WO) .................. PCT/JP2013/081651

(51) Int. Cl.
*H01S 3/036* (2006.01)
*H01S 3/104* (2006.01)
(Continued)

(52) U.S. Cl.
CPC .......... *H01S 3/036* (2013.01); *B01D 53/0446* (2013.01); *B01D 53/346* (2013.01);
(Continued)

(58) Field of Classification Search
CPC .......... H01S 3/036; H01S 3/104; H01S 3/225; B01D 53/0446; B01D 53/346; B01D 53/82; B01D 2253/108; B01D 2251/602
See application file for complete search history.

(56) References Cited

U.S. PATENT DOCUMENTS 4,629,611 A 12/1986 Fan
4,740,982 A 4/1988 Hakuta et al.
(Continued)

FOREIGN PATENT DOCUMENTS

JP 61-251186 A 11/1986
JP 05-049837 A 3/1993
(Continued)

OTHER PUBLICATIONS

International Search Report—PCT/JP2014/081106, dated Feb. 24, 2015.
(Continued)

*Primary Examiner* — Dung Nguyen
(74) *Attorney, Agent, or Firm* — Studebaker & Brackett PC

(57) ABSTRACT

A gas laser apparatus may include: a laser chamber connected through a first control valve to a first laser gas supply source that supplies a first laser gas containing a halogen gas and connected through a second control valve to a second laser gas supply source that supplies a second laser gas having a lower halogen gas concentration than the first laser gas; a purification column that removes at least a part of the halogen gas and a halogen compound from at least a part of a gas exhausted from the laser chamber; a booster pump, connected through a third control valve to the laser chamber, which raises a pressure of a gas having passed through the purification column to a gas pressure that is higher than an operating gas pressure of the laser chamber; and a controller that calculates, on a basis of a first amount of a gas supplied from the booster pump through the third control valve to the laser chamber, a second amount of the first laser gas that is to be supplied to the laser chamber and controls the first control valve on a basis of a result of the calculation of the second amount.

14 Claims, 24 Drawing Sheets

Related U.S. Application Data continuation of application No. PCT/JP2014/081106, filed on Nov. 25, 2014.

(51) Int. Cl.
*H01S 3/225* (2006.01)
*B01D 53/04* (2006.01)
*B01D 53/34* (2006.01)
*B01D 53/82* (2006.01)
*B01D 53/86* (2006.01)
*B01D 53/68* (2006.01)

(52) U.S. Cl.
CPC ........... *B01D 53/685* (2013.01); *B01D 53/82* (2013.01); *B01D 53/86* (2013.01); *H01S 3/104* (2013.01); *H01S 3/225* (2013.01); *B01D 2251/404* (2013.01); *B01D 2251/602* (2013.01); *B01D 2253/108* (2013.01); *B01D 2255/20753* (2013.01); *B01D 2255/20761* (2013.01); *B01D 2257/2027* (2013.01); *B01D 2259/40003* (2013.01)

(56) References Cited

U.S. PATENT DOCUMENTS

| | | | | |
|---|---|---|---|---|
| 6,338,253 | B1 * | 1/2002 | Freedman | ................. F17C 7/04 62/48.1 |
| 6,496,527 | B1 | 12/2002 | Terashima et al. | |
| 2002/0006148 | A1 * | 1/2002 | Govorkov | ................. H01S 3/22 372/55 |
| 2010/0086459 | A1 | 4/2010 | Ikeda et al. | |
| 2013/0100980 | A1 | 4/2013 | Abe et al. | |

FOREIGN PATENT DOCUMENTS

| | | |
|---|---|---|
| JP | 11-054851 A | 2/1999 |
| JP | 2000-114622 A | 4/2000 |
| JP | 2000-294856 A | 10/2000 |
| JP | 2010-076972 A | 4/2010 |
| JP | 2010-092920 A | 4/2010 |
| JP | 4891969 B2 | 3/2012 |
| JP | 2013-110381 A | 6/2013 |

OTHER PUBLICATIONS

An Office Action mailed by the Japanese Patent Office dated Apr. 24, 2018, which corresponds to Japanese Patent Application No. 2018-042452 and is related to U.S. Appl. No. 15/631,676 with English language translation.

An Office Action mailed by the Japanese Patent Office dated Apr. 24, 2018, which corresponds to Japanese Patent Application No. 2018-042453 and is related to U.S. Appl. No. 15/631,676 with English language translation.

An Office Action mailed by the Japanese Patent Office dated Apr. 24, 2018, which corresponds to Japanese Patent Application No. 2018-042454 and is related to U.S. Appl. No. 15/631,676 with English language translation.

* cited by examiner

GAS LASER APPARATUS

CROSS-REFERENCE TO RELATED APPLICATIONS

This application is a Divisional application of U.S. patent application Ser. No. 15/145,016, filed May 3, 2016, which is a Continuation application of International Patent Application No. PCT/JP2014/081106, filed Nov. 25, 2014, which claims benefit of priority to International Patent Application No. PCT/JP2013/081651, filed Nov. 25, 2013, the entire content of which is incorporated herein by reference.

TECHNICAL FIELD

The present disclosure relates to a gas laser apparatus.

BACKGROUND ART

In recent years, along with the miniaturization and integration of semiconductor integrated circuits, a semiconductor exposure device (hereinafter referred to as "exposure device") has been required to have higher resolution. For this reason, shortening of the wavelength of light that is emitted from an exposure light source has been under development. Generally, as an exposure light source, a gas laser apparatus is used instead of a conventional mercury lamp. For example, as a gas laser apparatus for exposure, a KrF excimer laser apparatus configured to output ultraviolet laser light with a wavelength of 248 nm as well as an ArF excimer laser apparatus configured to output ultraviolet laser light with a wavelength of 193 nm may be used.

As next-generation exposure technology, immersion exposure has been put to practical use. In immersion exposure, a gap between an exposure lens in an exposure device and a wafer is filled with fluid. Since the refractive index between the exposure lens and the wafer changes, an apparent wavelength of the exposure light source is shortened. In a case where immersion exposure is performed using an ArF excimer laser apparatus as an exposure light source, a wafer is irradiated with ultraviolet light whose wavelength in water is 134 nm. This technique may be referred to as "ArF immersion exposure (or ArF immersion lithography)".

Natural oscillation wavelengths of KrF and ArF excimer laser apparatuses are as wide as approximately 350 to 400 pm. Therefore, the constitution of a projector lens by a material that transmits ultraviolet rays such as KrF or ArF laser light may cause chromatic aberration, thus lowering resolution. Therefore, a spectrum line width of laser light that is outputted from a gas laser apparatus needs to be narrowed to the extent that chromatic aberration can be ignored. In order to narrow a spectrum line width, a line narrow module (LNM) having a line narrowing element (an etalon, a grating, or the like) may be provided in a laser resonator of a gas laser apparatus. In the following, a laser apparatus whose spectrum line width is narrowed may be referred to as a "line narrowed laser apparatus".

CITATION LIST

Patent Document

Patent Document 1: Japanese Patent No. 4891969
Patent Document 2: United States Patent Application Publication No. 2010/0086459

SUMMARY

A gas laser apparatus according to an aspect of the present disclosure may include: a laser chamber connected through a first control valve to a first laser gas supply source that supplies a first laser gas containing a halogen gas and connected through a second control valve to a second laser gas supply source that supplies a second laser gas having a lower halogen gas concentration than the first laser gas; a purification column that removes at least a part of the halogen gas and a halogen compound from at least a part of a gas exhausted from the laser chamber; a booster pump, connected through a third control valve to the laser chamber, which raises a pressure of a gas having passed through the purification column to a gas pressure that is higher than an operating gas pressure of the laser chamber; and a controller that calculates, on a basis of a first amount of a gas supplied from the booster pump through the third control valve to the laser chamber, a second amount of the first laser gas that is to be supplied to the laser chamber and controls the first control valve on a basis of a result of the calculation of the second amount.

A gas laser apparatus according to another aspect of the present disclosure may include: a laser chamber connected through a first control valve to a first laser gas supply source that supplies a first laser gas containing a halogen gas and connected through a second control valve to a second laser gas supply source that supplies a second laser gas having a lower halogen gas concentration than the first laser gas; a purification column that removes at least a part of the halogen gas and a halogen compound from at least a part of a gas exhausted from the laser chamber; a booster pump, connected through a third control valve to the laser chamber, which raises a pressure of a gas having passed through the purification column to a gas pressure that is higher than an operating gas pressure of the laser chamber; a first tank disposed between the purification column and the booster pump; a first pressure sensor that measures a first pressure inside the first tank; a second tank disposed between the booster pump and the third control valve; a second pressure sensor that measures a second pressure inside the second tank; and a controller that controls the booster pump on a basis of the first pressure and controls the third control valve on a basis of the second pressure.

A gas laser apparatus according to another aspect of the present disclosure may include: a laser chamber connected through a first control valve to a first laser gas supply source that supplies a first laser gas containing a halogen gas and connected through a second control valve to a second laser gas supply source that supplies a second laser gas having a lower halogen gas concentration than the first laser gas; a fourth control valve disposed between the second laser gas supply source and the second control valve; a purification column that removes at least a part of the halogen gas and a halogen compound from at least a part of a gas exhausted from the laser chamber; a booster pump, connected through a third control valve to a pipe between the fourth control valve and the second control valve, which raises a pressure of a gas having passed through the purification column to a gas pressure that is higher than an operating gas pressure of the laser chamber; and a controller that selectively executes a first control mode in which the third control valve is closed and the fourth control valve is opened and a second control mode in which the fourth control valve is closed and the third control valve is opened.

A gas laser apparatus according to still another aspect of the present disclosure may include: a first laser chamber connected through a first control valve to a first laser gas supply source that supplies a first laser gas containing a halogen gas and connected through a second control valve to a second laser gas supply source that supplies a second laser gas having a lower halogen gas concentration than the first laser gas; a second laser chamber connected through a sixth control valve to the first laser gas supply source and connected through a seventh control valve to the second laser gas supply source; a common pipe connected to the second laser gas supply source and divided into a first branch pipe in which the second control valve is disposed and a second branch pipe in which the seventh control valve is disposed; a fourth control valve disposed in the common pipe; a purification column that removes at least a part of the halogen gas and a halogen compound from at least a part of a gas exhausted from the first laser chamber and at least a part of a gas exhausted from the second laser chamber; and a booster pump, connected through the third control valve to the common pipe between the fourth control valve and a place where the common pipe is divided into the first and second branch pipes, which raises a pressure of a gas having passed through the purification column to a gas pressure that is higher than an operating gas pressure of the first laser chamber and an operating gas pressure of the second laser chamber.

BRIEF DESCRIPTION OF DRAWINGS

Exemplary embodiments of the present disclosure will be described hereinafter with reference to the appended drawings.

In the drawings, a dashed arrow means at least one of an input and an output of a signal. In the drawings, a solid arrow means the movement of matter or the travel of light.

DESCRIPTION OF EMBODIMENTS

Figure 1:
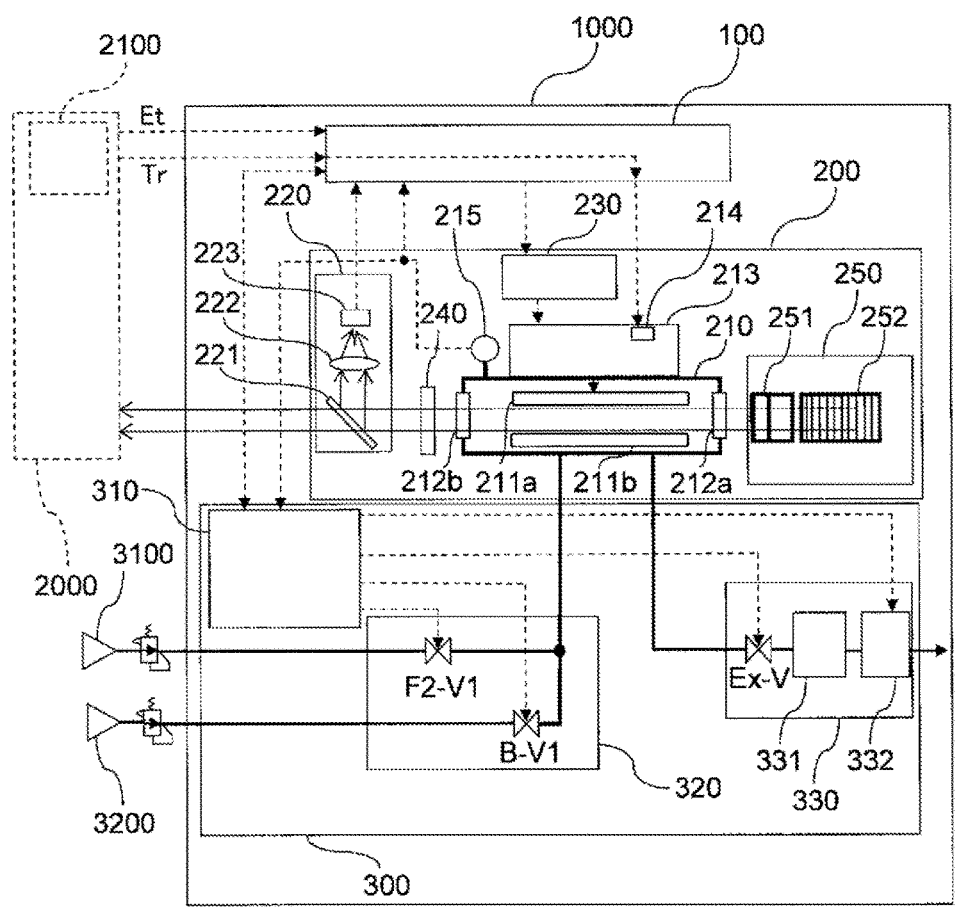
FIG. 1 is a diagram illustrating an example of a configuration of an excimer laser apparatus.

Details
1. Outline
2. Excimer Laser Apparatus
3. Laser Apparatuses Including Gas Purification Systems According to Embodiments of Present Disclosure
   3.1 Laser Apparatus Including Gas Purification System According to First Embodiment of Present Disclosure
   3.2 Laser Apparatus Including Gas Purification System According to Second Embodiment of Present Disclosure
   3.3 Laser Apparatus Including Gas Purification System According to Third Embodiment of Present Disclosure
   3.4 Laser Apparatus Including Gas Purification System According to Fourth Embodiment of Present Disclosure
   3.5 Laser Apparatus Including Gas Purification System According to Fifth Embodiment of Present Disclosure
   3.6 Laser Apparatus Including Gas Purification System According to Sixth Embodiment of Present Disclosure
4. Controller According to Embodiment of Present Disclosure Embodiments of the present disclosure will be described in detail hereinafter with reference to the drawings. The embodiments described hereinafter indicate several examples of the present disclosure, and are not intended to limit the content of the present disclosure. Furthermore, not all of the configurations and operations described in the embodiments are required configurations and operations in the present disclosure. Note that identical constituent elements will be given identical reference numerals, and redundant descriptions thereof will be omitted.

1. Outline

An embodiment of the present disclosure may relate to a gas purification system. An embodiment of the present disclosure may relate to a laser apparatus. An embodiment of the present disclosure may relate to a laser apparatus including a gas purification system.

A laser apparatus according to an embodiment of the present disclosure may be a discharge excitation gas laser apparatus. The discharge excitation gas laser apparatus may be an apparatus configured for laser oscillation such that a laser gas that is supplied to a chamber is discharged and excited by applying a predetermined voltage to a pair of electrodes disposed in the chamber. The discharge excitation gas laser apparatus may be an excimer laser apparatus. A laser apparatus according to an embodiment of the present disclosure may be a laser apparatus for use in a semiconductor exposure device.

The discharge excitation gas laser apparatus for use in a semiconductor exposure device may be an apparatus configured to output pulse laser light having a desired energy with longer-term stability. Long-term laser oscillation in the discharge excitation gas laser apparatus for use in a semiconductor exposure device may generate impurities in the gas supplied to the chamber of the laser apparatus. The impurities generated in the gas may absorb pulse laser light or worsen the condition of discharge of the gas. The impurities generated in the gas may make it difficult or impossible to output pulse laser light having the desired energy.

In order to output pulse laser light having the desired energy, at least a part of the gas containing the impurities may be replaced with a new gas containing few impurities. In a case where at least a part of the gas containing the impurities is replaced with a new gas containing few impurities, there may be an increase in the amount of consumption of a gas that is supplied to the chamber of the laser apparatus.

A gas laser apparatus according to an embodiment of the present disclosure may include: a laser chamber connected through a first control valve to a first laser gas supply source that supplies a first laser gas containing a halogen gas and connected through a second control valve to a second laser gas supply source that supplies a second laser gas having a lower halogen gas concentration than the first laser gas; a purification column that removes at least a part of the halogen gas and a halogen compound from at least a part of a gas exhausted from the laser chamber; a booster pump, connected through a third control valve to the laser chamber, which raises a pressure of a gas having passed through the purification column to a gas pressure that is higher than an operating gas pressure of the laser chamber; and a controller that calculates, on a basis of a first amount of a gas supplied from the booster pump through the third control valve to the laser chamber, a second amount of the first laser gas that is to be supplied to the laser chamber and controls the first control valve on a basis of a result of the calculation of the second amount.

A gas laser apparatus according to an embodiment of the present disclosure may include: a laser chamber connected through a first control valve to a first laser gas supply source that supplies a first laser gas containing a halogen gas and connected through a second control valve to a second laser gas supply source that supplies a second laser gas having a lower halogen gas concentration than the first laser gas; a fourth control valve disposed between the second laser gas supply source and the second control valve; a purification column that removes at least a part of the halogen gas and a halogen compound from at least a part of a gas exhausted from the laser chamber; a booster pump, connected through a third control valve to a pipe between the fourth control valve and the second control valve, which raises a pressure of a gas having passed through the purification column to a gas pressure that is higher than an operating gas pressure of the laser chamber; and a controller that selectively executes a first control mode in which the third control valve is closed and the fourth control valve is opened and a second control mode in which the fourth control valve is closed and the third control valve is opened.

A gas laser apparatus according to an embodiment of the present disclosure may include: a first laser chamber connected through a first control valve to a first laser gas supply source that supplies a first laser gas containing a halogen gas and connected through a second control valve to a second laser gas supply source that supplies a second laser gas having a lower halogen gas concentration than the first laser gas; a second laser chamber connected through a sixth control valve to the first laser gas supply source and connected through a seventh control valve to the second laser gas supply source; a common pipe connected to the second laser gas supply source and divided into a first branch pipe in which the second control valve is disposed and a second branch pipe in which the seventh control valve is disposed; a fourth control valve disposed in the common pipe; a purification column that removes at least a part of the halogen gas and a halogen compound from at least a part of a gas exhausted from the first laser chamber and at least a part of a gas exhausted from the second laser chamber; and a booster pump, connected through the third control valve to the common pipe between the fourth control valve and a place where the common pipe is divided into the first and second branch pipes, which raises a pressure of a gas having passed through the purification column to a gas pressure that is higher than an operating gas pressure of the first laser chamber and an operating gas pressure of the second laser chamber.

An embodiment of the present disclosure makes it possible to provide a gas purification system or a laser apparatus capable of replacing at least a part of a gas containing impurities with a purified gas. An embodiment of the present disclosure makes it possible to provide a gas purification system or a laser apparatus capable of reducing an amount of consumption of a gas.

2. Excimer Laser Apparatus

FIG. 1 is a diagram illustrating an example of a configuration of an excimer laser apparatus.

An excimer laser apparatus 1000 is a discharge excitation gas laser apparatus. The excimer laser apparatus 1000 may be used together with an exposure device 2000. Laser light emitted from the excimer laser apparatus 1000 may enter the exposure device 2000. The exposure device 2000 may include an exposure device controller 2100. The exposure device controller 2100 may be configured to control the semiconductor exposure device 2000. The exposure device controller 2100 may be configured to send a signal to a laser control unit 100 of the laser apparatus 1000.

The excimer laser apparatus 1000 may include the laser control unit 100, a laser oscillation system 200, and a gas control system 300. The laser control unit 100 may be configured to control the laser oscillation system 200 and the gas control system 300. The laser control unit 100 may be configured to receive signals from a power monitor 220 and chamber pressure sensor 215 of the laser oscillation system 200 and send signals to a charger 230 and a switch 214 of a pulse power module (PPM) 213. The laser control unit 100 may be configured to receive an emission trigger Tr from the exposure device controller 2100.

The laser oscillation system 200 may include a chamber 210, a laser resonator, a power monitor 220, and the charger 230.

The chamber 210 may be configured to generate light by discharging and exciting a gas supplied to the chamber 210 and emitting the light thus generated. The chamber 210 may be disposed on an optical path of the laser resonator. The chamber 210 may include a pair of discharge electrodes 211a and 211b, two windows 212a and 212b, the pulse power module 213, and the chamber pressure sensor 215. The pair of discharge electrodes 211a and 211b may be configured to apply a voltage to a gas supplied into the chamber 210. The two windows 212a and 212b may be configured to cause the light generated in the chamber 210 to be transmitted out of the chamber 210. The pulse power module 213 may be configured to apply a pulse voltage between the pair of discharge electrodes 211a and 211b. The pulse power module 213 may include the switch 214. The pulse power module 213 may be configured to apply a pulse voltage between the pair of discharge electrodes 211a and 211b by switching on and off the switch 214. The switch 214 may receive an emission trigger Tr from the laser control unit 100. The chamber pressure sensor 215 may be configured to measure a pressure (total pressure) of the gas supplied into the chamber 210. The chamber pressure sensor 215 may be configured to send a signal representing the pressure thus measured to the laser control unit 100 and a gas control unit 310 of the gas control system 300.

The laser resonator may be configured to obtain laser light from the light generated and emitted from the chamber 210. The laser resonator may include an output coupling (OC) mirror 240 and a line narrow module (LNM) 250. The output coupling mirror 240 may be a partial reflection mirror configured to transmit a part of the light emitted from the chamber 210 and reflect a part of the light emitted from the chamber 210. The line narrow module 250 may be configured to narrow the range of wavelengths of the light emitted from the chamber 210. The line narrow module 250 may include a prism 251 and a grating 252. The prism 251 may be configured to enlarge the beam diameter of the light emitted from the chamber 210. The prism 251 may be configured to change the angle of incidence of the light entering the grating 252. The grating 252 may be configured to diffract the light emitted from the chamber 210 and select a wavelength of the light emitted from the chamber 210. Mounting of the grating 252 may be Littrow mounting, in which the angle of incidence of the light entering the grating 252 and the angle of diffraction of the light diffracted by the grating 252 are completely or substantially equal.

The power monitor 220 may be configured to detect pulse energy of laser light outputted from the output coupling mirror 240. The power monitor 220 may include a beam splitter 221, a collector lens 222, and an optical sensor 223. The beam splitter 221 of the power monitor 220 may be disposed on the optical path of light from the laser resonator. The beam splitter 221 may be configured to transmit a part of the laser light outputted from the output coupling mirror 240 and reflect a part of the laser light outputted from the output coupling mirror 240. The collector lens 222 and optical sensor 223 of the power monitor 220 may be disposed on an optical path of the laser light reflected by the beam splitter 221. The collector lens 222 may be configured to focus the laser light reflected by the beam splitter 221 onto the optical sensor 223. The optical sensor 223 may be configured to convert pulse energy of the laser light focused by the collector lens 222 into an electrical signal and send the electrical signal to the laser control unit 100.

The charger 230 may be configured to charge the pulse power module 213. The charger 230 may receive a signal from the laser control unit 100 and be controlled by the laser control unit 100.

The gas control system 300 may include the gas control unit 310, a gas supply device 320, and an exhaust device 330. The gas control unit 310 may be controlled by the laser control unit 100. The gas control unit 310 may be configured to send a signal to the laser control unit 100. The gas control unit 310 may receive a signal from the chamber pressure sensor 215 of the laser oscillation system 200. The gas control unit 310 may be configured to control the gas supply device 320 and the exhaust device 330. The gas control unit 310 may be configured to control valves F2-V1 and B-V1 of the gas supply device 320 and a valve Ex-V and an exhaust pump 332 of the exhaust device 330.

The gas supply device 320 may include a pipe connected to a fluorine-containing gas supply source 3100 and to the chamber 210 of the laser oscillation system 200. The gas supply device 320 may include the valve F2-V1 provided in the pipe connected to the fluorine-containing gas supply source 3100 and to the chamber 210 of the laser oscillation system 200. The supply of a fluorine-containing gas from the fluorine-containing gas supply source 3100 to the chamber 210 of the laser oscillation system 200 may be controlled by the valve F2-V1. The valve F2-V1 may be controlled by the gas control unit 310.

The gas supply device 320 may include a pipe connected to a buffer gas supply source 3200 and to the chamber 210 of the laser oscillation system 200. The gas supply device 320 may include the valve B-V1 provided in the pipe connected to the buffer gas supply source 3200 and to the chamber 210 of the laser oscillation system 200. The supply of a buffer gas from the buffer gas supply source 3200 to the chamber 210 of the laser oscillation system 200 may be controlled by the valve B-V1. The valve B-V1 may be controlled by the gas control unit 310.

The exhaust device 330 may include a pipe connected to the chamber 210 of the laser oscillator system 200 and to the outside. The exhaust device 330 may include the valve Ex-V provided in the pipe connected to the chamber 210 of the laser oscillator system 200 and to the outside. The exhaust of a gas from the chamber 210 of the laser oscillator system 200 to the outside may be controlled by the valve Ex-V. The valve Ex-V may be controlled by the gas control unit 310. The exhaust device 330 may include a fluorine trap 331 and the exhaust pump 332. The fluorine trap 331 and the exhaust pump 332 may be provided in the pipe connected to the chamber 210 of the laser oscillator system 200 and to the outside. The fluorine trap 331 may be configured to trap fluorine contained in a gas to be exhausted from the chamber 210 of the laser oscillator system 200 to the outside. The exhaust pump 332 may be configured to exhaust the gas from the chamber 210 of the laser oscillator system 200 to the outside. Operation of the exhaust pump 332 may be controlled by the gas control unit 310.

The fluorine-containing gas supply source 3100 may be a gas cylinder including a regulator configured to supply a fluorine-containing gas containing a fluorine gas that is a halogen gas. The fluorine-containing gas may be a mixed gas of fluorine and rare gasses, such as a mixed gas of fluorine, argon, and neon or a mixed gas of fluorine, krypton, and neon.

The buffer gas supply source 3200 may be a gas cylinder including a regulator configured to supply a buffer gas (a fluorine-free gas). The buffer gas may be a mixed gas of rare gasses, such as a mixed gas of argon and neon or a mixed gas of krypton and neon.

The following describes a method for controlling energy of laser light in the excimer laser apparatus 1000.

First, upon receiving a target pulse energy Et from the exposure device controller 2100, the laser control unit 100 may send, to the charger 230, a signal representing a predetermined charging voltage Vhv for achieving the target pulse energy Et.

Next, upon receiving an emission trigger Tr from the exposure device controller 2100, the laser control unit 100 may apply a voltage between the pair of discharge electrodes 211a and 211b by switching on the switch 214 of the pulse power module 213. Light may be generated in the chamber 210 by discharging and exciting a gas supplied between the pair of discharge electrodes 211a and 211b. The light generated in the chamber 210 may be outputted as laser light by the laser resonator. The laser light outputted from the laser resonator may be narrowed by the grating 252 of the laser resonator. The laser light thus narrowed may be outputted from the output coupling mirror 240. The laser light outputted from the output coupling mirror 240 may enter the power monitor 220. Pulse energy Er of the laser light may be measured by the power monitor 220. The pulse energy Er measured by the power monitor 220 may be sent to the laser control unit 100. A part of the laser light outputted from the output coupling mirror 240 may enter the exposure device 2000.

Next, on the basis of a difference $\Delta E$ between the target pulse energy Et and the pulse energy Er thus measured, the laser control unit 100 may perform feedback control of the charging voltage Vhv to be sent to the charger 230.

In this manner, the charging voltage Vhv to be sent to the charger 230 may be controlled so that the pulse energy Er thus measured may become equal to the target pulse energy Et. The laser apparatus 1000 may output, in synchronization with an emission trigger Tr, pulse laser light having a predetermined pulse energy.

The following describes an operation of complete gas replacement in the excimer laser apparatus 1000.

First, the laser control unit 100 may send, to the gas control unit 310 of the gas control system 300, a signal for starting complete gas replacement.

Next, the gas control unit 310 may bring the exhaust pump 332 of the exhaust device 330 into operation.

Next, the gas control unit 310 may open the valve Ex-V to exhaust the gas in the chamber 210 until a pressure P1 measured by the chamber pressure sensor 215 becomes a pressure that is close to a vacuum.

Next, the gas control unit 310 may close the valve Ex-V and stop the exhaust pump 332.

Next, the gas control unit 310 may control the opening and closing of the valves F2-V1 and B-V1 so that the pressure P1 measured by the chamber pressure sensor 215 may become equal to a predetermined pressure and the composition of a gas that is supplied to the chamber 210 becomes a predetermined composition.

In this manner, complete gas replacement in the excimer laser apparatus 1000 may be performed.

The following describes an operation of partial gas replacement in the excimer laser apparatus 1000.

Continuation of laser oscillation in the excimer laser apparatus 1000 may generate impurities, i.e., fluorine compounds, in the gas contained in the chamber 210. Examples of the impurities, i.e., fluorine compounds, may include hydrogen fluoride (HF), carbon tetrafluoride ($CF_4$), silicon tetrafluoride ($SiF_4$), nitrogen trifluoride ($NF_3$), hexafluoroethane ($C_2F_6$), and the like. The impurities generated in the gas contained in the chamber 210 may absorb pulse laser light or worsen the condition of discharge of the gas. The impurities generated in the gas contained in the chamber 210 may drop the energy of the pulse laser light or degrade the stability of the energy of the pulse laser light. In order to suppress an increase in concentration of the impurities in the gas contained in the chamber 210, it is possible to supply the chamber 210 with a predetermined amount of a new gas containing few impurities and exhaust the gas in the chamber 210 by the same amount as the amount of the new gas. In this manner, partial gas replacement in the excimer laser apparatus 1000 may be performed.

Figure 2:
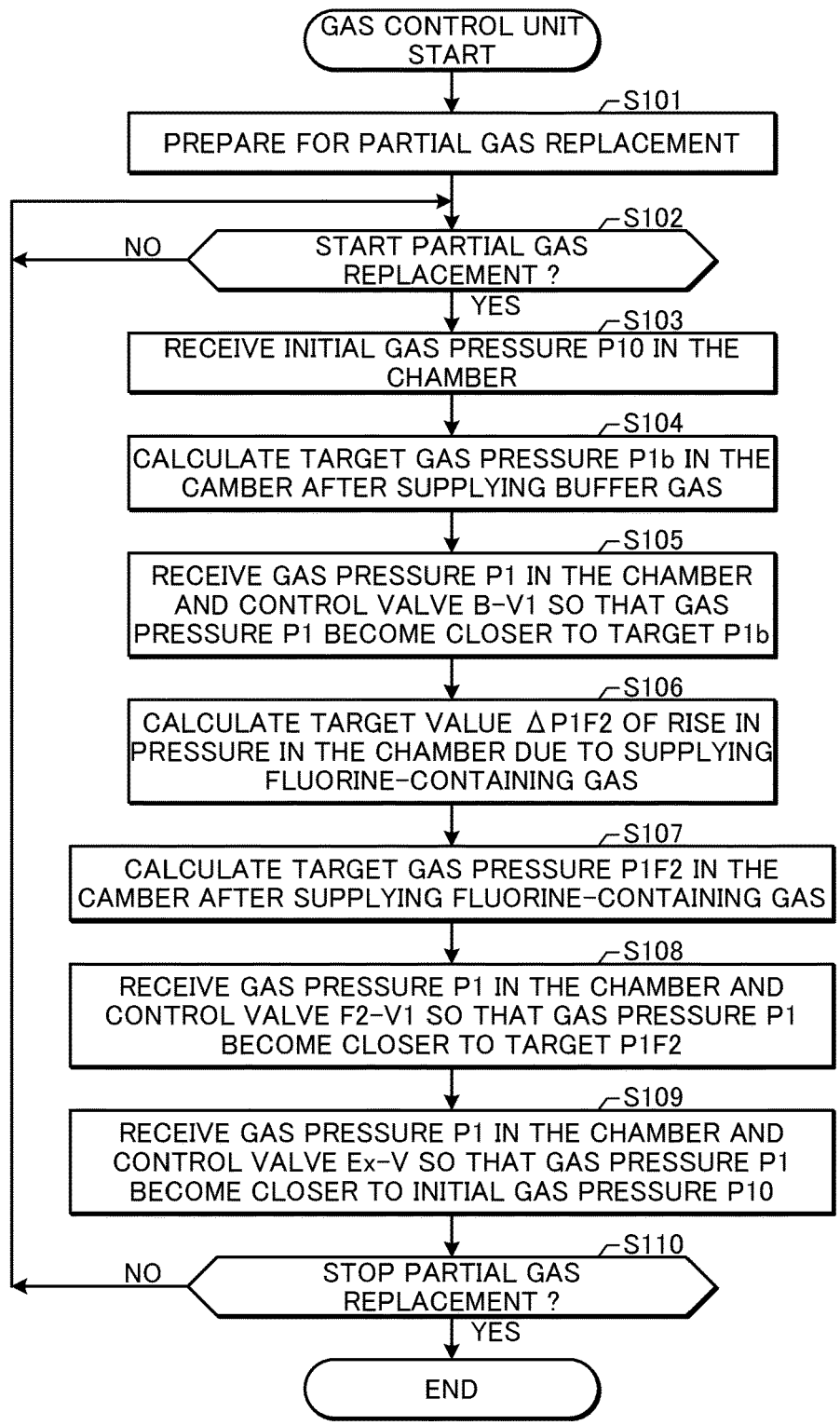
FIG. 2 is a diagram illustrating an example of operation of a gas control unit of the excimer laser apparatus.

FIG. 2 is a diagram illustrating an example of operation of the gas control unit of the excimer laser apparatus.

In step S101, the gas control unit 310 may make preparations for partial gas replacement. In preparation for partial gas replacement, the valve F2-V1 and valve B-V1 of the gas supply device 320 and the valve Ex-V of the exhaust device 330 may all be closed. In preparation for partial gas replacement, the exhaust pump 332 of the exhaust device 330 may be brought into operation.

In step S102, the gas control unit 310 may determine whether it has received, from the laser control unit 100, a signal for starting partial gas replacement. The laser control unit 100 may send the signal for starting partial gas replacement to the gas control unit 310 in accordance with a predetermined number of shots of laser oscillation, predetermined time intervals, or the like. In a case where the gas control unit 310 has received, from the laser control unit 100, the signal for starting partial gas replacement, the gas control unit 310 may proceed to step S103. In a case where the gas control unit 310 has not received, from the laser control unit 100, the signal for starting partial gas replacement, the gas control unit 310 may repeat step S102.

In step S103, the gas control unit 310 may receive an initial pressure P10 of the gas in the chamber 210 (i.e., a pressure of the gas in the chamber 210 before partial gas replacement) from the chamber pressure sensor 215.

In step S104, the gas control unit 310 may calculate a target value P1$b$ of the pressure of the gas in the chamber 210 after supplying the buffer gas to the chamber 210.

In step S105, the gas control unit 310 may receive the pressure P1 of the gas in the chamber 210 from the chamber pressure sensor 215 and may control the valve B-V1 so that the pressure P1 may become closer to the target value P1$b$. In this manner, the buffer gas may be supplied to the chamber 210.

In step S106, the gas control unit 310 may calculate a target value $\Delta$P1F2 of a rise in pressure in the chamber 210 due to supplying the fluorine-containing gas to the chamber 210. The gas control unit 310 may calculate the target value $\Delta$P1F2 of the rise in pressure so that the concentration of a fluorine gas in the gas in the chamber 210 may become equal to a predetermined concentration CF2. For example, in a case where the fluorine-containing gas is a fluorine gas, the target value $\Delta$P1F2 of the rise in pressure may be calculated according to the formulae $\Delta$P1$b$=P1$b$−P10 and $\Delta$P1F2=CF2×$\Delta$P1$b$/(1−CF2). In a case where the fluorine-containing gas is a mixed gas, the calculation may be performed further in consideration of the mixing ratio of fluorine.

In step S107, the gas control unit 310 may calculate a target value P1F2 of the pressure of the gas in the chamber 210 after supplying the fluorine-containing gas to the chamber 210. The target value P1F2 of the pressure may be calculated according to the formula P1F2=P1$b$+$\Delta$P1F2.

In step S108, the gas control unit 310 may receive the pressure P1 of the gas in the chamber 210 from the chamber pressure sensor 215 and may control the valve F2-V1 so that the pressure P1 may become closer to the target value P1F2. In this manner, the fluorine-containing gas may be supplied to the chamber 210.

In step S109, the gas control unit 310 may receive the pressure P1 of the gas in the chamber 210 from the chamber pressure sensor 215 and may control the valve Ex-V so that the pressure P1 may become closer to the initial pressure P10. In this manner, a part of the gas in the chamber 210 may be exhausted to the outside.

In step S110, the gas control unit 310 may determine whether it has received, from the laser control unit 100, a signal for stopping partial gas replacement. The laser control unit 100 may send the signal for stopping partial gas replacement to the gas control unit 310 in accordance with the pressure P1 measured by the chamber pressure sensor 215 or the like. In a case where the gas control unit 310 has received, from the laser control unit 100, the signal for stopping partial gas replacement, the gas control unit 310 may terminate the operation for partial gas replacement. In a case where the gas control unit 310 has not received, from the laser control unit 100, the signal for stopping partial gas replacement, the gas control unit 310 may return to step S102.

An amount Q of a gas that is replaced by a single round of partial gas replacement may be calculated according to the formula Q=($\Delta$P1$b$+$\Delta$P1F2)×V/P, where V is the volume of the chamber 210 and P is 1 atm (1013 hPa).

In this manner, an increase in the concentration of impurities that may be generated in the gas in the chamber 210 may be suppressed by replacing the predetermined amount Q of the gas in the chamber 210 with the predetermined number of shots of laser oscillation or at the predetermined time intervals.

In a case where a new gas containing few impurities is supplied to the chamber 210 and the gas in the chamber 210 is exhausted by the same amount as the amount of the new gas in order to suppress an increase in the concentration of impurities in the gas in the chamber 210, the amount of consumption of gas may increase.

Figure 3:
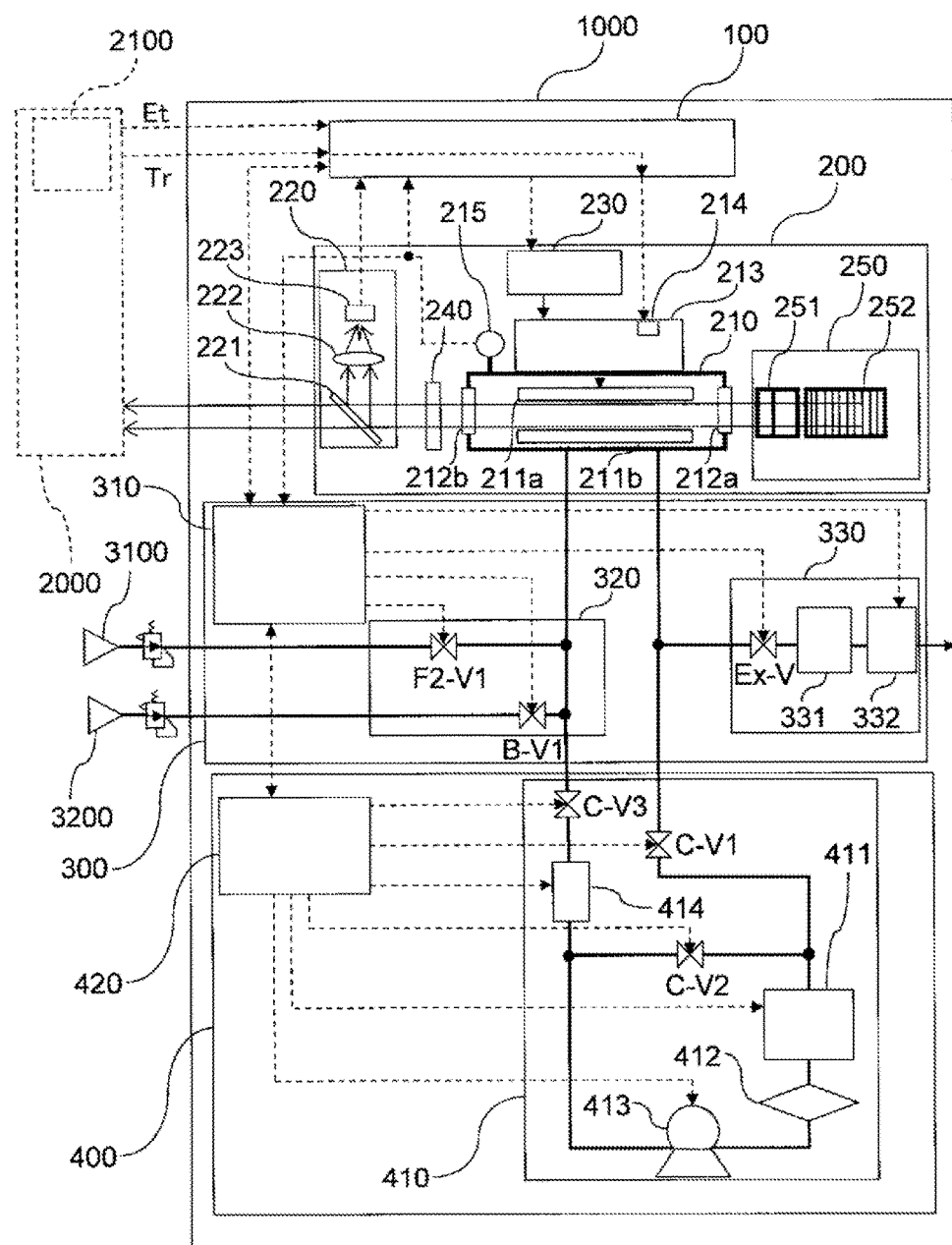
FIG. 3 is a diagram illustrating an example of a configuration of a laser apparatus including a gas purification system according to a first embodiment of the present disclosure.

3. Laser Apparatuses Including Gas Purification Systems According to Embodiments of Present Disclosure 3.1 Laser Apparatus Including Gas Purification System According to First Embodiment of Present Disclosure FIG. 3 is a diagram illustrating an example of a configuration of a laser apparatus including a gas purification system according to a first embodiment of the present disclosure. The laser apparatus shown in FIG. 3 may include the same configuration as the laser apparatus illustrated in FIG. 1. Components of the laser apparatus illustrated in FIG. 3 which are identical to those of the laser apparatus illustrated in FIG. 1 are given the same reference signs, and as such, are omitted from the description below.

The excimer laser apparatus 1000 according to the first embodiment of the present disclosure may further include a gas purification system 400.

The gas purification system 400 may include a gas purification device 410 and a gas purification control unit 420. The gas purification control unit 420 may be configured to receive a signal from the gas control unit 310 of the gas control system 300 and send a signal to the gas control unit 310. The gas purification control unit 420 may be configured to control the gas purification device 410.

The gas purification device 410 may include a purification column 411, a filter 412, a circulation pump 413, a mass flow controller (MFC) 414, a valve C-V1, a valve C-V2, and a valve C-V3. The gas purification device 410 may include a circulation gas pipe connecting the valve C-V1, the purification column 411, the filter 412, the circulation pump 413, the mass flow controller 414, and the valve C-V3. The gas purification device 410 may include a bypass pipe connecting a pipe between the valve C-V1 and the purification column 411 and a pipe between the circulation pump 413 and the mass flow controller 414. The bypass pipe may be provided with the valve C-V2.

One end of the circulation gas pipe may be connected to a pipe connected to both the chamber 210 of the laser oscillation system 200 and the exhaust device 330 of the gas control system 300. The other end of the circulation gas pipe may be connected to a pipe connected to both the chamber 210 of the laser oscillation system 200 and the gas supply device 320 of the gas control system 300.

The purification column 411, the circulation pump 413, the mass flow controller 414, the valve C-V1, the valve C-V2, and the valve C-V3 may be configured to receive signals from the gas purification control unit 420. The purification column 411, the circulation pump 413, the mass flow controller 414, the valve C-V1, the valve C-V2, and the valve C-V3 may be configured to be controlled by the gas purification control unit 420.

The purification column 411 may include a first treatment tower (not illustrated) and a second treatment tower (not illustrated). The first treatment tower may be filled with a treating agent for treating a fluorine gas and impurities, i.e., fluorine compounds. The treating agent for treating the fluorine gas and the impurities, i.e., the fluorine compounds, may be a treating agent containing at least one of zeolite and calcium oxide. The second treatment tower may be filled with a treating agent for treating at least one of moisture and oxygen generated by the treatment of the fluorine gas and the impurities, i.e., the fluorine compounds, by the treating agent filled in the first treatment tower. The treating agent for treating at least one of moisture and oxygen may be a treating agent containing at least one of a nickel (Ni) catalyst, a copper (Cu) catalyst, and a compound thereof. The purification column 411 may include a heating device (and a temperature regulating device) (not illustrated) for causing the first treatment tower and the second treatment tower to operate at a temperature that is higher than room temperature.

The filter 412 may be a filter for trapping particles generated by the discharge of a gas supplied between the pair of discharge electrodes 211a and 211b in the chamber 210. The filter 412 may be a filter made of a material that hardly reacts with fluorine. The material that hardly reacts with fluorine may be a metal or ceramic material.

The circulation pump 413 may be a pump configured to cause a gas to flow through the circulation gas pipe.

The mass flow controller 414 may be a valve configured to control the mass flow of the gas flowing through the circulation gas pipe.

The following describes an operation of complete gas replacement in the excimer laser apparatus 1000 according to the first embodiment of the present disclosure.

First, the laser control unit 100 may send a signal for starting complete gas replacement to the gas control unit 310 of the gas control system 300.

Next, the gas control unit 310 may bring the exhaust pump 332 of the exhaust device 330 into operation.

Next, the gas control unit 310 and the gas purification control unit 420 may open the valve Ex-V, the valve CV-1, the valve C-V2, and the valve C-V3 to exhaust the gas in the chamber 210 and the gas in the pipe of the gas purification device 410. The gas control unit 310 and the gas purification control unit 420 may exhaust the gas in the chamber 210 and the gas in the pipe of the gas purification device 410 until the pressure P1 measured by the chamber pressure sensor 215 becomes a pressure that is close to a vacuum.

Next, the gas control unit 310 may close the valve Ex-V and stop the exhaust pump 332.

Next, the gas control unit 310 may control the opening and closing of the valves F2-V1 and B-V1 so that the pressure P1 measured by the chamber pressure sensor 215 may become equal to a predetermined pressure and the composition of a gas that is supplied to the chamber 210 may become a predetermined composition.

Next, the gas purification control unit 420 may close the valve C-V1, the valve C-V2, and the valve C-V3.

In this manner, the chamber 210 and the gas purification device 420 may be filled with a gas. In this manner, complete gas replacement in the excimer laser apparatus 1000 may be performed.

Furthermore, the gas purification control unit 420 may heat the purification column 411 (and control the temperature of the purification column 411).

Figure 4:
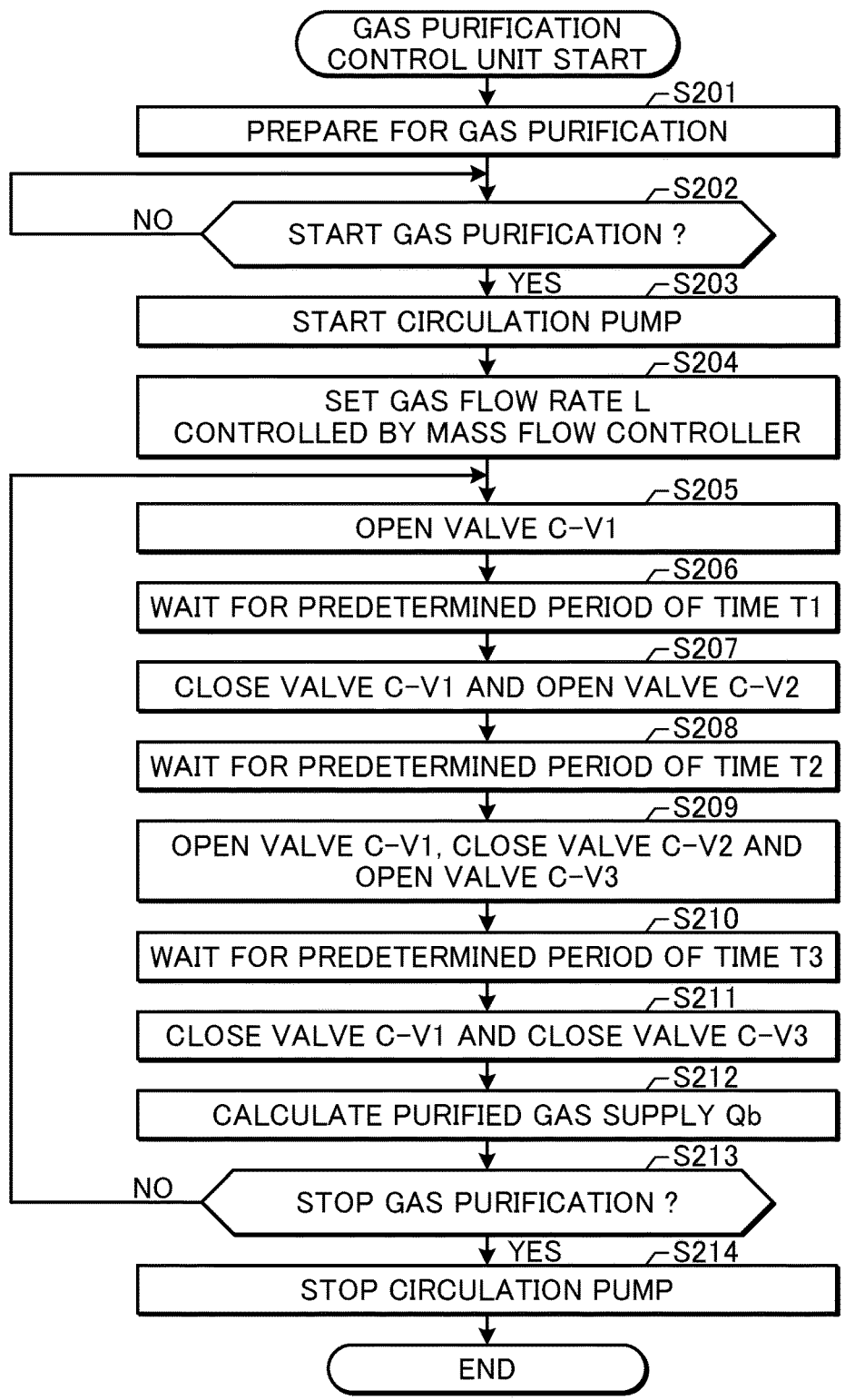
FIG. 4 is a diagram illustrating an example of operation of a gas purification control unit of the laser apparatus including the gas purification system according to the first embodiment of the present disclosure.

FIG. 4 is a diagram illustrating an example of operation of the gas purification control unit of the laser apparatus including the gas purification system according to the first embodiment of the present disclosure.

In step S201, the gas purification control unit 420 may make preparations for gas purification. In preparation for gas purification, the circulation gas pipe and bypass pipe of the gas purification control unit 410 may be filled with a gas. In preparation for gas purification, the purification column 411 may be heated. In preparation for gas purification, the valve C-V1, the valve C-V2, and the valve C-V3 may be closed.

In step S202, the gas purification control unit 420 may determine whether it has received, from the laser control unit 100 through the gas control unit 310, a signal for starting gas purification. The laser control unit 100 may send the signal for starting gas purification to the gas purification control unit 420 through the gas control unit 310 in accordance with the predetermined number of shots of laser oscillation, the predetermined time intervals, and the like. In a case where the gas purification control unit 420 has received, from the laser control unit 100 through the gas control unit 310, the signal for starting gas purification, the gas purification control unit 420 may proceed to step S203. In a case where the gas purification control unit 420 has not received, from the laser control unit 100 through the gas control unit 310, the signal for starting gas purification, the gas purification control unit 420 may repeat step S202.

In step S203, the gas purification control unit 420 may bring the circulation pump 413 of the gas purification device 410 into operation.

In step S204, the gas purification control unit 420 may set a flow rate L of a gas that is controlled by the mass flow controller 414 of the gas purification device 410. The setting of the flow rate L of the gas that is controlled by the mass flow controller 414 of the gas purification device 410 may be carried out by sending the flow rate L from the gas purification control unit 420 to the mass flow controller 414.

In step S205, the gas purification control unit 420 may open the valve C-V1 of the gas purification device 410.

In step S206, the gas purification control unit 420 may wait for a predetermined period of time T1. By the gas purification control unit 420 waiting for the predetermined period of time T1, the pressure of the gas in the circulation gas pipe of the gas purification device 410 may be made substantially equal to the pressure of the gas in the chamber 210.

In step S207, the gas purification control unit 420 may open the valve C-V2 of the gas purification device 410 and close the valve C-V1.

In step S208, the gas purification control unit 420 may wait for a predetermined period of time T2. By the gas purification control unit 420 waiting for the predetermined period of time T2, the gas contained in the gas purification device 410 may be circulated through the circulation gas pipe and the bypass pipe and more effectively purified by the purification column 411 and the filter 412.

In step S209, the gas purification control unit 420 may close the valve C-V2 of the gas purification device 410 and open the valve C-V1 and valve C-V3 of the gas purification device 410.

In step S210, the gas purification control unit 420 may wait for a predetermined period of time T3. While the gas purification control unit 420 is waiting for the predetermined period of time T3, the circulation pump 413 and the mass flow controller 414 may supply the gas purified by the purification column 411 and the filter 412 to the chamber 210 at the flow rate L through the circulation gas pipe.

In step S211, the gas purification control unit 420 may close the valve C-V1 and valve C-V3 of the gas purification device 410.

In step S212, the gas purification control unit 420 may calculate an amount Qb of the purified gas supplied to the chamber 210. The amount Qb of the purified gas supplied to the chamber 210 may be calculated according to the formula Qb=L×T3. The gas purification control unit 420 may send, to the laser control unit 100 through the gas control unit 310, the amount Qb of the purified gas supplied to the chamber 210.

In step S213, the gas purification control unit 420 may determine whether it has received, from the laser control unit 100 through the gas control unit 310, a signal for stopping gas purification. The laser control unit 100 may send the signal for stopping gas purification to the gas purification control unit 420 through the gas control unit 310 in accordance with the pressure P1 measured by the chamber pressure sensor 215 and the like. In a case where the gas purification control unit 420 has received, from the laser control unit 100 through the gas control unit 310, the signal for stopping gas purification, the gas purification control unit 420 may stop the circulation pump 413 of the gas purification device 410 in step S214. Then, the operation of gas purification may be terminated. In a case where the gas purification control unit 420 has not received, from the laser control unit 100 through the gas control unit 310, the signal for stopping gas purification, the gas purification control unit 420 may return to step S205.

Figure 5:
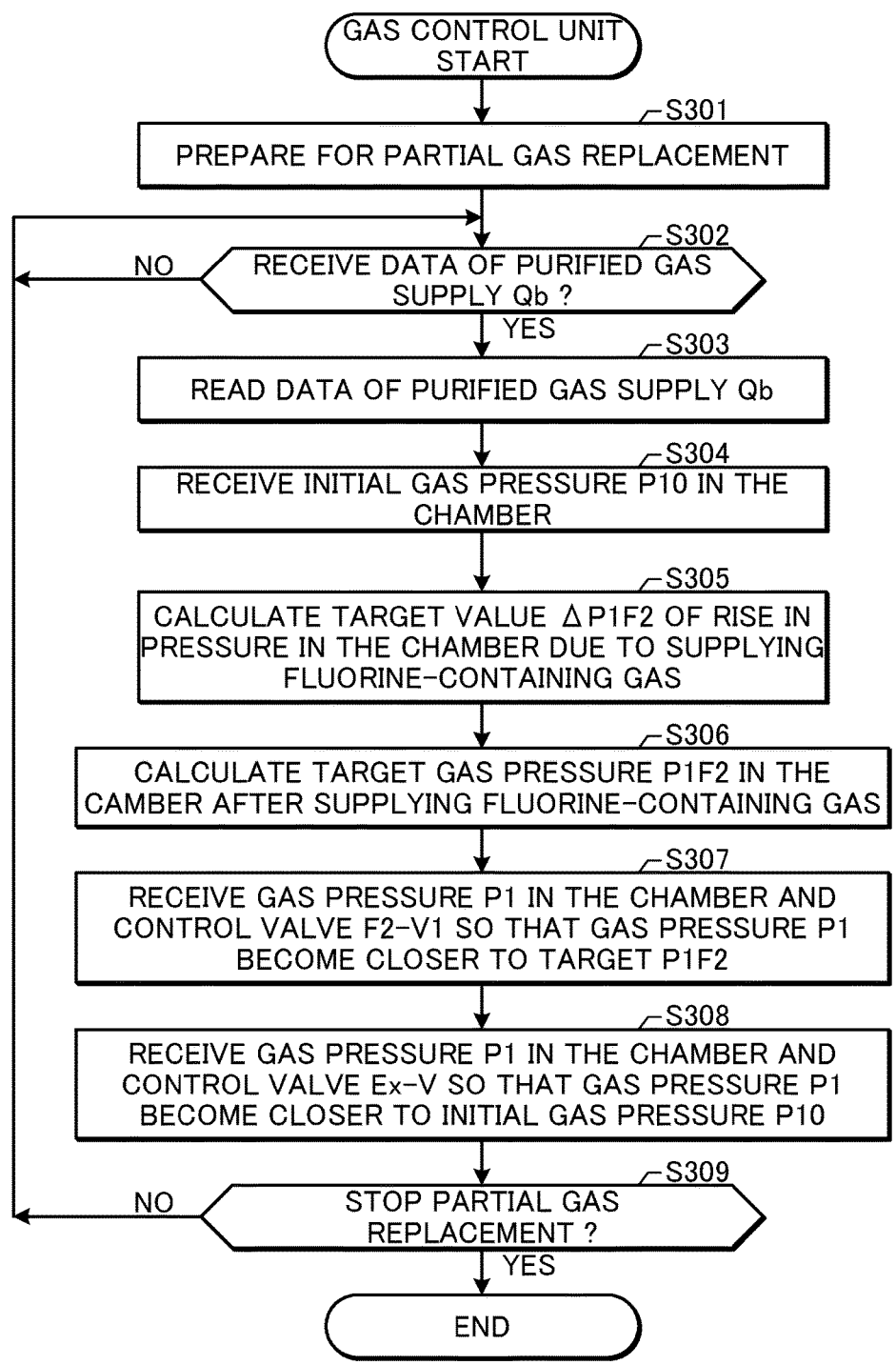
FIG. 5 is a diagram illustrating an example of operation of a gas control unit of the laser apparatus including the gas purification system according to the first embodiment of the present disclosure.

FIG. 5 is a diagram illustrating an example of operation of the gas control unit of the laser apparatus including the gas purification system according to the first embodiment of the present disclosure.

In step S301, the gas control unit 310 may make preparations for partial gas replacement. In preparation for partial gas replacement, the valve F2-V1 and valve B-V1 of the gas supply device 320 and the valve Ex-V of the exhaust device 330 may all be closed. In preparation for partial gas replacement, the exhaust pump 332 of the exhaust device 330 may be brought into operation.

In step 302, the gas control unit 310 may determine whether it has received, from the laser control unit 100, data representing the amount Qb of the purified gas supplied to the chamber 210. The laser control unit 100 may send, to the gas control unit 310, the amount Qb of the purified gas supplied to the chamber 210 thus received from the gas purification control unit 420. In a case where the gas control unit 310 has received, from the laser control unit 100, data representing the amount Qb of the purified gas supplied to the chamber 210, the gas control unit 310 may proceed to step S303. In a case where the gas control unit 310 has not received, from the laser control unit 100, data representing the amount Qb of the purified gas supplied to the chamber 210, the gas control unit 310 may repeat step S302.

In step S303, the gas control unit 310 may read out the amount Qb, received from the laser control unit 100, of the purified gas supplied to the chamber 210. In a case where the purified gas supplied to the chamber 210 completely or substantially does not contain a fluorine gas, the concentration of fluorine in the gas in the chamber 210 may be reduced. In order to suppress a reduction in the concentration of fluorine in the gas in the chamber 210, fluorine-containing gas may be supplied (replenished) from the fluorine-containing gas supply source 3100 into the chamber 210, depending on the amount Qb of the purified gas supplied to the chamber 210.

In step S304, the gas control unit 310 may receive an initial pressure P10 of the gas in the chamber 210 (i.e., a pressure of the gas in the chamber 210 before partial gas replacement) from the chamber pressure sensor 215.

In step S305, the gas control unit 310 may calculate a target value $\Delta P1F2$ of a rise in pressure in the chamber 210 due to supplying the fluorine-containing gas to the chamber 210. The gas control unit 310 may calculate the target value $\Delta P1F2$ of the rise in pressure so that the concentration of a fluorine gas in the gas in the chamber 210 may become equal to a predetermined concentration CF2. For example, in a case where the fluorine-containing gas is a fluorine gas, the target value $\Delta P1F2$ of the rise in pressure may be calculated according to the formula $\Delta P1F2=CF2 \times (Qb/V)/(1-CF2)$, where V is the volume of the chamber 210. In a case where the fluorine-containing gas is a mixed gas, the calculation may be performed further in consideration of a mixing ratio of fluorine.

In step S306, the gas control unit 310 may calculate a target value P1F2 of the pressure of the gas in the chamber 210 after supplying the fluorine-containing gas to the chamber 210. The target value P1F2 of the pressure may be calculated according to the formula $P1F2=P10+Qb/V+\Delta P1F2$.

In step S307, the gas control unit 310 may receive the pressure P1 of the gas in the chamber 210 from the chamber pressure sensor 215 and may control the valve F2-V1 so that the pressure P1 may become closer to the target value P1F2. In this manner, the fluorine-containing gas may be supplied to the chamber 210.

In step S308, the gas control unit 310 may receive the pressure P1 of the gas in the chamber 210 from the chamber pressure sensor 215 and may control the valve Ex-V so that the pressure P1 may become closer to the initial pressure P10. In this manner, a part of the gas in the chamber 210 may be exhausted to the outside.

In step S309, the gas control unit 310 may determine whether it has received, from the laser control unit 100, a signal for stopping partial gas replacement. The laser control unit 100 may send the signal for stopping partial gas replacement to the gas control unit 310 based on the pressure P1 measured by the chamber pressure sensor 215 and the like. In a case where the gas control unit 310 has received, from the laser control unit 100, the signal for stopping partial gas replacement, the gas control unit 310 may terminate the operation for partial gas replacement. In a case where the gas control unit 310 has not received, from the laser control unit 100, the signal for stopping partial gas replacement, the gas control unit 310 may return to step S302.

In the excimer laser apparatus 1000 according to the first embodiment of the present disclosure, the mass flow controller 414 is used to obtain the amount of the purified gas that is supplied to the chamber 210. Alternatively, a flowmeter may be provided instead of the mass flow controller 414.

In this manner, the laser apparatus 1000 according to the first embodiment of the present disclosure makes it possible to purify a part of the gas in the chamber 210 and supply the purified gas to the chamber 210. In this manner, the laser apparatus 1000 according to the first embodiment of the present disclosure makes it possible to reduce the amount of a gas that is sent from the buffer gas supply source 3200 to the chamber 210.

Figure 6:
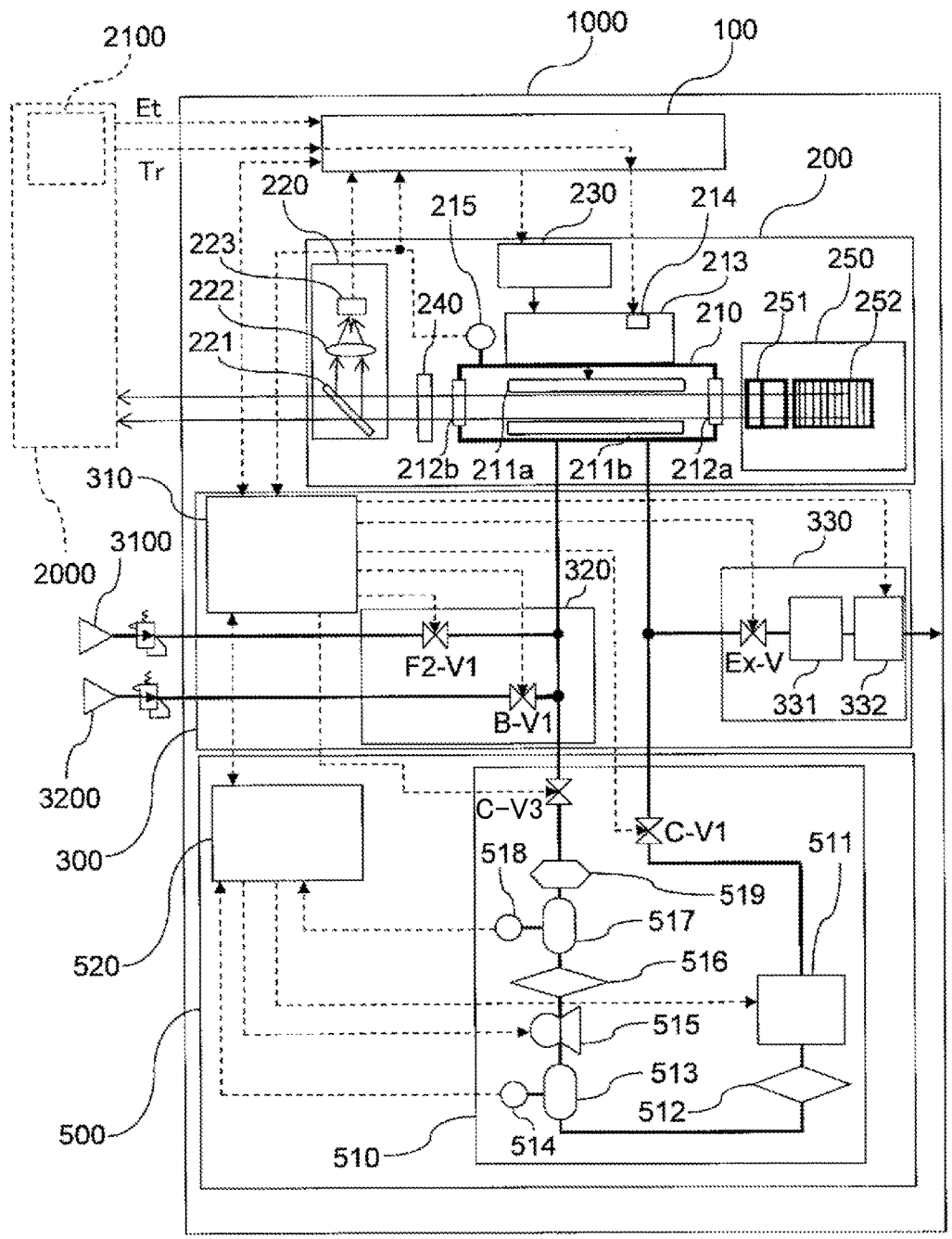
FIG. 6 is a diagram illustrating an example of a configuration of a laser apparatus including a gas purification system according to a second embodiment of the present disclosure.

3.2 Laser Apparatus Including Gas Purification System According to Second Embodiment of Present Disclosure FIG. 6 is a diagram illustrating an example of a configuration of a laser apparatus including a gas purification system according to a second embodiment of the present disclosure. The laser apparatus shown in FIG. 6 may include the same configuration as the laser apparatus illustrated in FIG. 1. Components of the laser apparatus illustrated in FIG. 6 which are identical to those of the laser apparatus illustrated in FIG. 1 are given the same reference signs, and as such, are omitted from the description below. The excimer laser apparatus 1000 according to the second embodiment of the present disclosure may further include a gas purification system 500.

The gas purification system 500 may include a gas purification device 510 and a gas purification control unit 520. The gas purification control unit 520 may be configured to receive a signal from the gas control unit 310 of the gas control system 300 and send a signal to the gas control unit 310. The gas purification control unit 520 may be configured to receive a signal from the gas purification device 510 and send a signal to the gas purification device 510.

The gas purification device 510 may include a purification column 511, a first filter 512, a first tank 513, a first pressure sensor 514, a booster pump 515, a second filter 516, a second tank 517, a second pressure sensor 518, a purifier 519, a valve C-V1, and a valve C-V3. The gas purification device 510 may include a circulation gas pipe connecting the valve C-V1, the purification column 511, the first filter 512, the first tank 513, the booster pump 515, the second filter 516, the second tank 517, the purifier 519, and the valve C-V3.

One end of the circulation gas pipe may be connected to a pipe connected to both the chamber 210 of the laser oscillation system 200 and the exhaust device 330 of the gas control system 300. The other end of the circulation gas pipe may be connected to a pipe connected to both the chamber 210 of the laser oscillation system 200 and the gas supply device 320 of the gas control system 300.

The purification column 511 and the booster pump 515 may be configured to receive a signal from the gas purification control unit 520. The purification column 511 and the booster pump 515 may be configured to be controlled by the gas purification control unit 520.

The first pressure sensor 514 and the second pressure sensor 518 may be configured to send signals representing measured pressures to the gas purification control unit 520.

The valve C-V1 and the valve C-V3 may be configured to receive signals from the gas control unit 310 of the gas control system 300. The valve C-V1 and the valve C-V3 may be configured to be controlled by the gas control unit 310 of the gas control system 300.

The purification column 511 may include a first treatment tower (not illustrated) and a second treatment tower (not illustrated). The first treatment tower may be filled with a treating agent for treating a fluorine gas and impurities, i.e., fluorine compounds. The treating agent for treating the fluorine gas and the impurities, i.e., the fluorine compounds, may be a treating agent containing at least one of zeolite and calcium oxide. The second treatment tower may be filled with a treating agent for treating at least one of moisture and oxygen generated by the treatment of the fluorine gas and the impurities, i.e., the fluorine compounds, by the treating agent filling the first treatment tower. The treating agent for treating at least one of moisture and oxygen may be a treating agent containing at least one of a nickel (Ni) catalyst, a copper (Cu) catalyst, and a compound thereof. The purification column 511 may include a heating device (and a temperature regulating device) (not illustrated) for causing the first treatment tower and the second treatment tower to operate at a temperature that is higher than room temperature.

The first filter 512 and the second filter 516 may each be a filter for trapping particles generated by discharge of a gas supplied between the pair of discharge electrodes 211a and 211b in the chamber 210. The first filter 512 and the second filter 516 may each be a filter made of a material that hardly reacts with fluorine. The material that hardly reacts with fluorine may be a metal or ceramic material.

The first tank 513 may be a container configured to contain a gas purified by the purification column 511 and the first filter 512. The volume of the first tank 513 may be 5 liters or larger and 15 liters or smaller.

The first pressure sensor 514 may be configured to measure a pressure of the purified gas contained in the first tank 513. The first pressure sensor 514 may be provided in the first tank 513. The first pressure sensor 514 may be configured to send a signal representing the measured gas pressure to the gas purification control unit 520.

The second tank 517 may be a container configured to contain a purified gas that is sent from the first tank 513 by the booster pump 515. The volume of the second tank 517 may be 5 liters or larger and 15 liters or smaller.

The second pressure sensor 518 may be configured to measure a pressure of the purified gas contained in the second tank 517. The second pressure sensor 518 may be provided in the second tank 517. The second pressure sensor 518 may be configured to send a signal representing the measured gas pressure to the gas purification control unit 520.

The booster pump 515 may be a pump configured to cause a gas to flow through the circulation gas pipe. The booster pump 515 may be provided between the first tank 513 and the second tank 517. The booster pump 515 may be configured to send a gas from the first tank 513 to the second tank 517. The booster pump 515 may receive a signal from the gas purification control unit 520 and be controlled by the gas purification control unit 520.

The purifier 519 may be a metal filter including a metal getter serving as a purification agent for a gas contained in the circulation gas pipe.

The following describes an operation of complete gas replacement in the excimer laser apparatus 1000 according to the second embodiment of the present disclosure.

First, the laser control unit 100 may send a signal for starting complete gas replacement to the gas control unit 310 of the gas control system 300.

Next, the gas control unit 310 may bring the exhaust pump 332 of the exhaust device 330 into operation.

Next, the gas control unit 310 may open the valve Ex-V, the valve CV-1, and the valve C-V3 to exhaust the gas in the chamber 210 and the gas in the pipe of the gas purification device 510. The gas control unit 310 may exhaust the gas in the chamber 210 and the gas in the pipe of the gas purification device 510 until the pressure P1 measured by the chamber pressure sensor 215 becomes a pressure that is close to a vacuum.

Next, the gas control unit 310 may close the valve Ex-V and stop the exhaust pump 332. The gas control unit 310 may close the valve C-V1 and the valve C-V3.

Next, the gas control unit 310 may control the opening and closing of the valves F2-V1 and B-V1 so that the pressure P1 measured by the chamber pressure sensor 215 may become equal to a predetermined pressure and the composition of a gas that is supplied to the chamber 210 may become a predetermined composition.

In this manner, the chamber 210 may be filled with a gas. The gas purification device 520 may be completely or substantially in a vacuum state. In this manner, complete gas replacement in the excimer laser apparatus 1000 according to the second embodiment of the present disclosure may be performed.

Furthermore, the gas purification control unit 520 may heat the purification column 511 (and control the temperature of the purification column 511).

Figure 7:
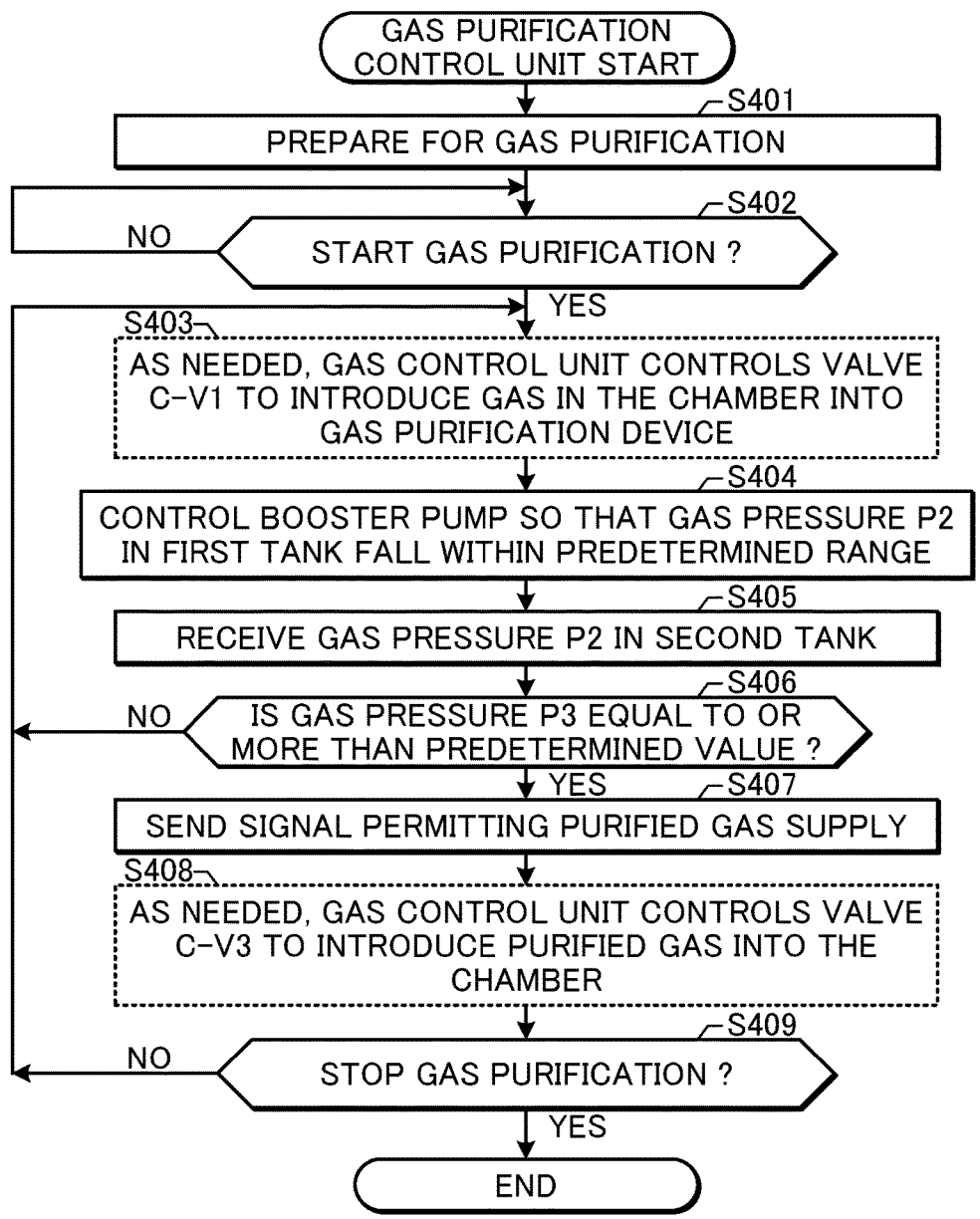
FIG. 7 is a diagram illustrating an example of operation of a gas purification control unit of the laser apparatus including the gas purification system according to the second embodiment of the present disclosure.

FIG. 7 is a diagram illustrating an example of operation of the gas purification control unit of the laser apparatus including the gas purification system according to the second embodiment of the present disclosure.

In step S401, the gas purification control unit 520 may make preparations for gas purification. In preparation for gas purification, the circulation gas pipe of the gas purification device 510 may be filled with a gas. In preparation for gas purification, the purification column 511 may be heated. In preparation for gas purification, the valve C-V1 and the valve C-V3 may be closed.

In step S402, the gas purification control unit 520 may determine whether it has received, from the laser control unit 100 through the gas control unit 310, a signal for starting gas purification. The laser control unit 100 may send the signal for starting gas purification to the gas purification control unit 520 through the gas control unit 310 based on the predetermined number of shots of laser oscillation, the predetermined time intervals, and the like. In a case where the gas purification control unit 520 has received, from the laser control unit 100 through the gas control unit 310, the signal for starting gas purification, the gas purification control unit 520 may proceed to step S403. In a case where the gas purification control unit 520 has not received, from the laser control unit 100 through the gas control unit 310, the signal for starting gas purification, the gas purification control unit 520 may repeat step S402.

In step S403, the gas control unit 310 of the gas control system 300 may as needed control the opening and closing of the valve C-V1 and thereby introduce the gas in the chamber 210 of the laser oscillation system 200 into the gas purification device 510. The gas in the chamber 210 which is introduced into the gas purification device 510 may be purified by the purification column 511 and the first filter 512 of the gas purification device 510. The gas thus purified may be supplied to the first tank 513 of the gas purification device 510.

In step S404, the gas purification control unit 520 may control the booster pump 515 of the gas purification device 510. The gas purification control unit 520 may receive a pressure P2 of the gas in the first tank 513 of the gas purification device 510 as measured by the first pressure sensor 514 of the gas purification device 510. The booster pump 515 may be controlled so that the pressure P2 of the gas in the first tank 513 of the gas purification device 510 may fall within a predetermined range of pressure. The booster pump 515 may be controlled so that the pressure P2 of the gas in the first tank 513 may satisfy P2min≤P2≤P2max. P2min may be the atmospheric pressure (1013 hPa). P2max may be a pressure (e.g., 1300 hPa) that is higher than the atmospheric pressure. The booster pump 515 may be configured to send the gas contained in the first tank 513 to the second tank 517. When the pressure P2 of the gas in the first tank 513 satisfies P2min≤P2, the booster pump 515 may more efficiently send the gas contained in the first tank 513 to the second tank 517. When the pressure P2 of the gas in the first tank 513 satisfies P2≤P2max, the booster pump 515 may more efficiently send a part of the gas in the chamber 210 to the first tank 513 of the gas purification device 510.

In step S405, the gas purification control unit 520 may receive a pressure P3 of the gas in the second tank 517 of the gas purification device 510 as measured by the second pressure sensor 518 of the gas purification device 510.

In step S406, the gas purification control unit 520 may determine whether the pressure P3 of the gas in the second tank 517 is equal to or higher than a predetermined pressure P3reg. The predetermined pressure P3reg may be a pressure (e.g., 5000 hPa or higher and 5700 hPa or lower) indicated by a regulator provided in a pipe through which the buffer gas is supplied. In a case where the pressure P3 of the gas in the second tank 517 is equal to or higher than the predetermined pressure P3reg, the gas purification control unit 520 may proceed to step S407. In a case where the pressure P3 of the gas in the second tank 517 is equal to or higher than the predetermined pressure P3reg, the gas in the second tank 517 may be more efficiently sent to the chamber 210. In a case where the pressure P3 of the gas in the second tank 517 is not equal to or higher than the predetermined pressure P3reg, the gas purification control unit 520 may return to step S403.

In step S407, the gas purification control unit 520 may send, to the gas control unit 310, a signal permitting the supply of purified gas to the chamber 210.

In step S408, the gas control unit 310 of the gas control system 300 may as needed control the opening and closing of the valve C-V3 and thereby introduce the purified gas in the gas purification device 510 into the chamber 210 of the laser oscillation system 200.

In step S409, the gas purification control unit 520 may determine whether it has received, from the laser control unit 100 through the gas control unit 310, a signal for stopping gas purification. The laser control unit 100 may send the signal for stopping gas purification to the gas purification control unit 520 through the gas control unit 310 based on the pressure P1 measured by the chamber pressure sensor 215 and the like. In a case where the gas purification control unit 520 has received, from the laser control unit 100 through the gas control unit 310, the signal for stopping gas purification, the gas purification control unit 520 may terminate the operation of gas purification. In a case where the gas purification control unit 520 has not received, from the laser control unit 100 through the gas control unit 310, the signal for stopping gas purification, the gas purification control unit 520 may return to step S403.

Figure 8:
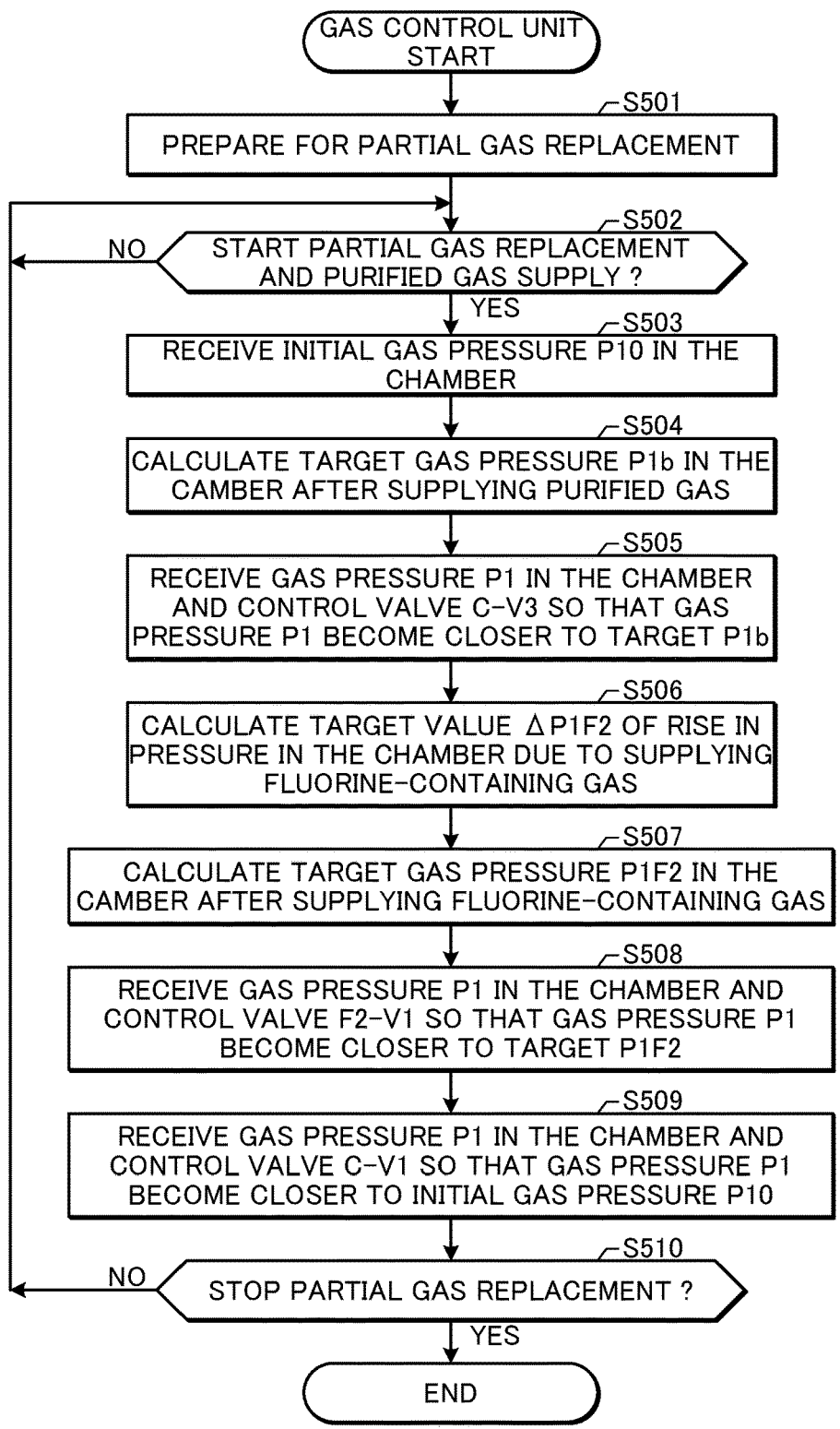
FIG. 8 is a diagram illustrating an example of operation of a gas control unit of the laser apparatus including the gas purification system according to the second embodiment of the present disclosure.

FIG. 8 is a diagram illustrating an example of operation of the gas control unit of the laser apparatus including the gas purification system according to the second embodiment of the present disclosure.

In step S501, the gas control unit 310 may make preparations for partial gas replacement. In preparation for partial gas replacement, the valve F2-V1 and valve B-V1 of the gas supply device 320 and the valve Ex-V of the exhaust device 330 may all be closed. In preparation for partial gas replacement, the valve C-V1 may as needed be opened to increase the pressure P3 of the gas in the second tank 513.

In step S502, the gas control unit 310 may determine whether it has received, from the laser control unit 100, a signal for starting partial gas replacement and whether it has received, from the gas purification control unit 520, a signal permitting the supply of the purified gas to the chamber 210. The laser control unit 100 may send the signal for starting partial gas replacement to the gas control unit 310 based on a predetermined number of shots of laser oscillation, predetermined time intervals, and the like. The gas purification control unit 520 may send the signal permitting the supply of the purified gas to the chamber 210 to the gas control unit 310 based on the value of the pressure P3 measured by the second pressure sensor 518. In a case where the gas control unit 310 has received both the signal for starting partial gas replacement from the laser control unit 100 and the signal permitting the supply of the purified gas to the chamber 210 from the gas purification control unit 520, the gas control unit 310 may proceed to step S503. In a case where the gas control unit 310 has not received at least either the signal for starting partial gas replacement from the laser control unit 100 or the signal permitting the supply of the purified gas to the chamber 210 from the gas purification control unit 520, the gas control unit 310 may repeat step S502.

In step S503, the gas control unit 310 may receive an initial pressure P10 of the gas in the chamber 210 (i.e., a pressure of the gas in the chamber 210 before partial gas replacement) from the chamber pressure sensor 215.

In step S504, the gas control unit 310 may calculate a target value $P1b$ of the pressure of the gas in the chamber 210 after supplying the purified gas to the chamber 210.

In step S505, the gas control unit 310 may receive the pressure P1 of the gas in the chamber 210 from the chamber pressure sensor 215 and may control the valve C-V3 so that the pressure P1 may become closer to the target value $P1b$. In this manner, the purified gas may be supplied from the gas purification device 510 to the chamber 210.

In step S506, the gas control unit 310 may calculate a target value $\Delta P1F2$ of a rise in pressure in the chamber 210 due to supplying the fluorine-containing gas to the chamber 210. The gas control unit 310 may calculate the target value $\Delta P1F2$ of the rise in pressure so that the concentration of a fluorine gas in the gas in the chamber 210 may become equal to a predetermined concentration CF2. For example, in a case where the fluorine-containing gas is a fluorine gas, the target value $\Delta P1F2$ of the rise in pressure may be calculated according to the formulae $\Delta P1b=P1b-P10$ and $\Delta P1F2=CF2\times\Delta P1b/(1-CF2)$. In a case where the fluorine-containing gas is a mixed gas, the calculation may be performed further in consideration of a mixing ratio of fluorine.

In step S507, the gas control unit 310 may calculate a target value P1F2 of the pressure of the gas in the chamber 210 after supplying the fluorine-containing gas to the chamber 210. The target value P1F2 of the pressure may be calculated according to the formula $P1F2=P1b+\Delta P1F2$.

In step S508, the gas control unit 310 may receive the pressure P1 of the gas in the chamber 210 from the chamber pressure sensor 215 and may control the valve F2-V1 so that the pressure P1 may become closer to the target value P1F2. In this manner, the fluorine-containing gas may be supplied to the chamber 210.

In step S509, the gas control unit 310 may receive the pressure P1 of the gas in the chamber 210 from the chamber pressure sensor 215 and may control the valve C-V1 so that the pressure P1 may become closer to the initial pressure P10. In this manner, a part of the gas in the chamber 210 may be introduced into the gas purification device 510.

In step S510, the gas control unit 310 may determine whether it has received, from the laser control unit 100, a signal for stopping partial gas replacement. The laser control unit 100 may send the signal for stopping partial gas replacement to the gas control unit 310 based on the pressure P1 measured by the chamber pressure sensor 215 and the like. In a case where the gas control unit 310 has received, from the laser control unit 100, the signal for stopping partial gas replacement, the gas control unit 310 may terminate the operation of partial gas replacement. In a case where the gas control unit 310 has not received, from the laser control unit 100, the signal for stopping partial gas replacement, the gas control unit 310 may return to step S502.

In this manner, the laser apparatus 1000 according to the second embodiment of the present disclosure makes it possible to purify a part of the gas in the chamber 210 and supply the purified gas to the chamber 210. In this manner, the laser apparatus 1000 according to the second embodiment of the present disclosure makes it possible to reduce the amount of a gas that is sent from the buffer gas supply source 3200 to the chamber 210.

Figure 9:
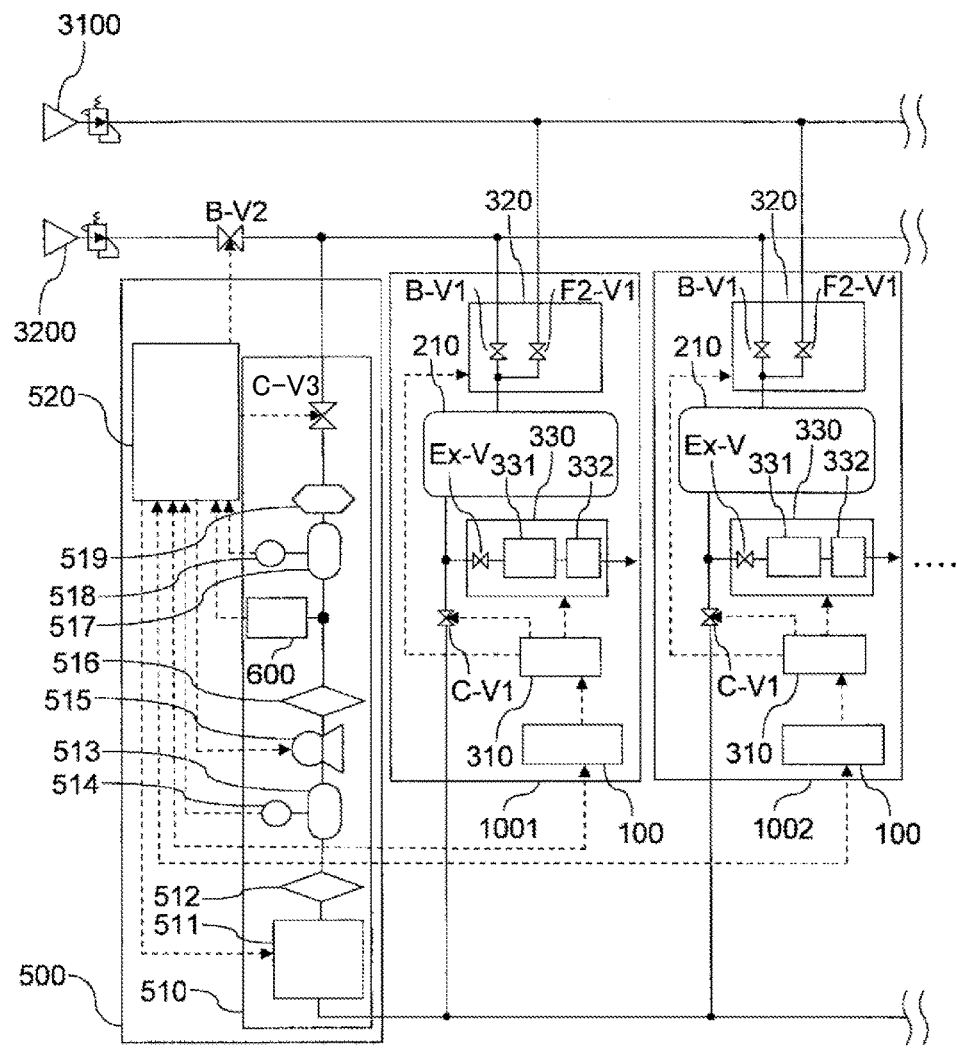
FIG. 9 is a diagram illustrating an example of a configuration of a laser apparatus including a gas purification system according to a third embodiment of the present disclosure.

3.3 Laser Apparatus Including Gas Purification System According to Third Embodiment of Present Disclosure FIG. 9 is a diagram illustrating an example of a configuration of a laser apparatus including a gas purification system according to a third embodiment of the present disclosure. The laser apparatus shown in FIG. 9 may include the same configuration as the laser apparatus illustrated in FIG. 6. Components of the laser apparatus illustrated in FIG. 9 which are identical to those of the laser apparatus illustrated in FIG. 6 are given the same reference signs, and as such, are omitted from the description below.

The laser apparatus according to the third embodiment of the present disclosure may include a plurality of excimer laser apparatuses such as a first excimer laser apparatus 1001 and a second excimer laser apparatus 1002.

One end of a circulation gas pipe of the gas purification system 500 may be connected through a plurality of valves C-V1 of the plurality of excimer laser apparatuses to a plurality of pipes. The plurality of pipes are connected to the plurality of chambers 210 of the plurality of excimer laser apparatuses, respectively, and to a plurality of exhaust devices 330, respectively.

The other end of the circulation gas pipe of the gas purification system 500 may be connected to a pipe connecting the buffer gas supply source 3200 and the plurality of gas supply devices 320 of the plurality of excimer laser apparatuses. The pipe connecting the buffer gas supply source 3200 and the plurality of gas supply devices 320 of the plurality of excimer laser apparatuses may correspond to a common pipe in the present disclosure. A gas purified by the gas purification device 510 may be supplied from the gas purification device 510 at completely or substantially the same pressure as the pressure of the regulator for the buffer gas supply source 3200. This allows a single gas purification device 510 to supply the purified gas to the plurality of excimer laser apparatuses.

The fluorine-containing gas supply source 3100 and the buffer gas supply source 3200 may be connected to the plurality of gas supply devices 320 of the plurality of excimer laser apparatuses.

The gas purification system 500 of the laser apparatus according to the third embodiment of the present disclosure may further include an oximeter 600. The oximeter 600 may be one configured to measure the concentration of oxygen in a gas flowing through the circulation gas pipe of the gas purification system 500. The oximeter 600 may be configured to send, to the gas purification control unit 520, data representing the concentration of oxygen in the gas flowing through the circulation gas pipe of the gas purification system 500.

In the laser apparatus according to the third embodiment of the present disclosure, a valve B-V2 may be provided to a pipe present between (i) the circulation gas pipe of the gas purification system 500 connected to the plurality of gas supply devices 320 of the plurality of excimer laser apparatuses and (ii) the regulator provided in the buffer gas supply source 3200.

The plurality of valves C-V1 of the plurality of excimer laser apparatuses may be controlled by the plurality of gas control units 310 of the plurality of excimer laser apparatuses, respectively.

The gas purification control unit 520 may perform at least either sending signals or receiving signals to or from the plurality of gas control units 310 through the laser control units 100 of the plurality of excimer laser apparatuses.

The following describes an operation of exhaust for the circulation gas pipe of the gas purification device 510 in the excimer laser apparatus 1000 according to the third embodiment of the present disclosure.

First, the gas purification control unit 520 may close the valve C-V3 and may close the plurality of valves C-V1 of the plurality of excimer laser apparatuses through the plurality of laser control units 100 and gas control units 310 of the plurality of excimer laser apparatuses.

Next, by bringing into operation an exhaust pump (not illustrated) connected to the circulation gas pipe of the gas purification device 510, the circulation gas pipe of the gas purification device 510 may be exhausted until pressures measured by the first pressure sensor 514 and the second pressure sensor 518 become pressures that are close to a vacuum. In this manner, the circulation gas pipe of the gas purification device may be brought into a state that is close to a vacuum.

Figure 10:
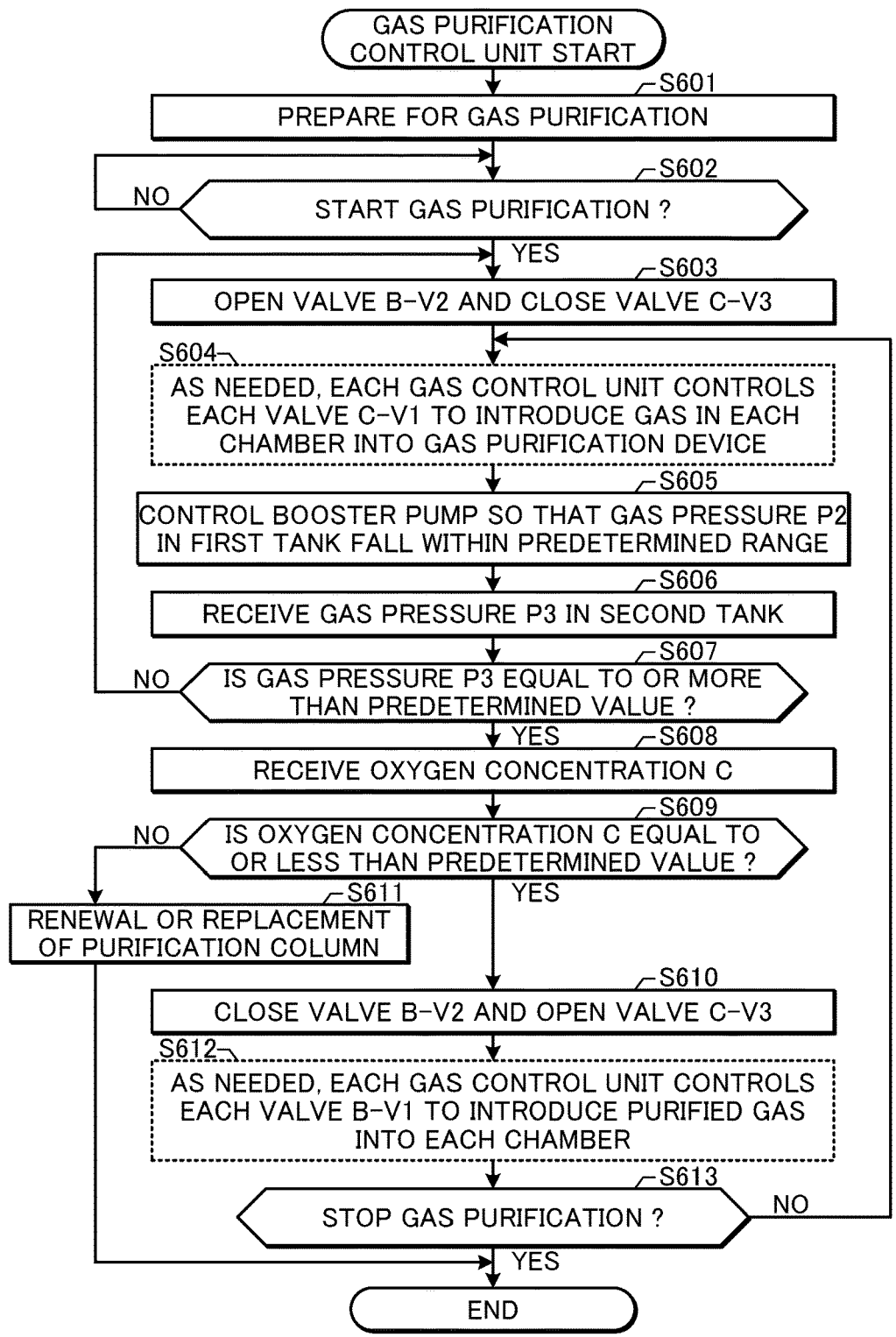
FIG. 10 is a diagram illustrating an example of operation of a gas purification control unit of the laser apparatus including the gas purification system according to the third embodiment of the present disclosure.

FIG. 10 is a diagram illustrating an example of operation of the gas purification control unit of the laser apparatus including the gas purification system according to the third embodiment of the present disclosure.

In step S601, the gas purification control unit 520 may make preparations for gas purification. In preparation for gas purification, the circulation gas pipe of the gas purification device 510 may be filled with a gas. In preparation for gas purification, the purification column 511 may be heated. In preparation for gas purification, the valves C-V1 and the valve C-V3 may be closed.

In step S602, the gas purification control unit 520 may determine whether it has received, from the laser control unit 100 of each excimer laser apparatus through the gas control unit 310 of the corresponding excimer laser apparatus, a signal for starting gas purification. Each laser control unit 100 may send the signal for starting gas purification to the gas purification control unit 520 through the corresponding gas control unit 310 based on the predetermined number of shots of laser oscillation, the predetermined time intervals, and the like. In a case where the gas purification control unit 520 has received, from each laser control unit 100 through the corresponding gas control unit 310, the signal for starting gas purification, the gas purification control unit 520 may proceed to step S603. In a case where the gas purification control unit 520 has not received, from each laser control unit 100 through the corresponding gas control unit 310, the signal for starting gas purification, the gas purification control unit 520 may repeat step S602.

In step S603, the gas purification control unit 520 may open the valve B-V2 and close the valve C-V3. That is, in a case where any of the plurality of gas control units 310 performs partial gas replacement, the supply of the buffer gas from the buffer gas supply source 3200 to each chamber 210 may be prepared.

In step S604, each gas control unit 310 may as needed control the opening and closing of the corresponding valve C-V1 and thereby introduce the gas in the corresponding chamber 210 into the gas purification device 510. The gas in each chamber 210 which is introduced into the gas purification device 510 may be purified by the purification column 511 and the first filter 512 of the gas purification device 510. The gas thus purified may be supplied to the first tank 513 of the gas purification device 510.

In step S605, the gas purification control unit 520 may control the booster pump 515. The gas purification control unit 520 may receive a pressure P2 of the gas in the first tank 513 as measured by the first pressure sensor 514. The booster pump 515 may be controlled so that the pressure P2 of the gas in the first tank 513 may fall within a predetermined range of pressure. The booster pump 515 may be controlled so that the pressure P2 of the gas in the first tank 513 may satisfy P2min≤P2≤P2max. P2min may be the atmospheric pressure (1013 hPa). P2max may be a pressure (e.g., 1300 hPa) that is higher than the atmospheric pressure. The booster pump 515 may be configured to send the gas contained in the first tank 513 to the second tank 517. When the pressure P2 of the gas in the first tank 513 satisfies P2min≤P2, the booster pump 515 may more efficiently send the gas contained in the first tank 513 to the second tank 517. When the pressure P2 of the gas in the first tank 513 satisfies P2≤P2max, the booster pump 515 may more efficiently send a part of the gas in each chamber 210 to the first tank 513 of the gas purification device 510.

In step S606, the gas purification control unit 520 may receive a pressure P3 of the gas in the second tank 517 as measured by the second pressure sensor 518.

In step S607, the gas purification control unit 520 may determine whether the pressure P3 of the gas in the second tank 517 is equal to or higher than a predetermined pressure P3reg. The predetermined pressure P3reg may be a pressure (e.g., 5000 hPa or higher and 5700 hPa or lower) indicated by a regulator provided in a pipe through which the buffer gas is supplied. In a case where the pressure P3 of the gas in the second tank 517 is equal to or higher than the predetermined pressure P3reg, the gas purification control unit 520 may proceed to step S608. In a case where the pressure P3 of the gas in the second tank 517 is equal to or higher than the predetermined pressure P3reg, the gas in the second tank 517 may be more efficiently sent to each chamber 210. In a case where the pressure P3 of the gas in the second tank 517 is not equal to or higher than the predetermined pressure P3reg, the gas purification control unit 520 may return to step S603.

In step S608, the gas purification control unit 520 may receive, from the oximeter 600, an oxygen concentration C in a gas flowing through the circulation gas pipe of the gas purification device 510. The oxygen concentration C may be measured by the oximeter 600 of the gas purification control unit 520.

In step S609, the gas purification control unit 520 may determine whether the oxygen concentration C in the gas flowing through the circulation gas pipe of the gas purification device 510 is equal to or lower than a predetermined concentration Cmax. In a case where the oxygen concentration C in the gas flowing through the circulation gas pipe of the gas purification device 510 is equal to or lower than the predetermined concentration Cmax, the gas purification control unit 520 may proceed to step S610. In a case where the oxygen concentration C in the gas flowing through the circulation gas pipe of the gas purification device 510 is equal to or lower than the predetermined concentration Cmax, the purification column 511 may function normally. In a case where the oxygen concentration C in the gas flowing through the circulation gas pipe of the gas purification device 510 is not equal to or lower than the predetermined concentration Cmax, the gas purification control unit 520 may proceed to step S611. In a case where the oxygen concentration C in the gas flowing through the circulation gas pipe of the gas purification device 510 is not equal to or lower than the predetermined concentration Cmax, the purification column 511 may not necessarily function normally.

In step S610, the gas purification control unit 520 may close the valve B-V2 and open the valve C-V3. That is, in a case where any of the plurality of gas control units 310 performs partial gas replacement, the supply of a gas purified by the gas purification device 510 from the gas purification device 510 to each chamber 210 may be prepared. After step S610, the gas purification control unit 520 may proceed to step S612.

In step S611, the gas purification control unit 520 may output, to each laser control unit 100, a signal for renewal or replacement of the purification column 511 or a signal indicating that the purification of a gas by the purification column 511 is difficult or impossible. In step S611, renewal or replacement of the purification column 511 may be performed.

In step S612, each gas control unit 310 may as needed control the opening and closing of the corresponding valve B-V1 and thereby introduce the gas purified by the gas purification device 510 into the corresponding chamber 210.

In step S613, the gas purification control unit 520 may determine whether it has received, from each laser control unit 100 through the corresponding gas control unit 310, a signal for stopping gas purification. Each laser control unit 100 may send the signal for stopping gas purification to the gas purification control unit 520 through the corresponding gas control unit 310 based on the pressure P1 measured by a chamber pressure sensor (not illustrated) and the like. In a case where the gas purification control unit 520 has received, from each laser control unit 100 through the corresponding gas control unit 310, the signal for stopping gas purification, the gas purification control unit 520 may terminate the operation of gas purification. In a case where the gas purification control unit 520 has not received, from each laser control unit 100 through the corresponding gas control unit 310, the signal for stopping gas purification, the gas purification control unit 520 may return to step S604.

Figure 11:
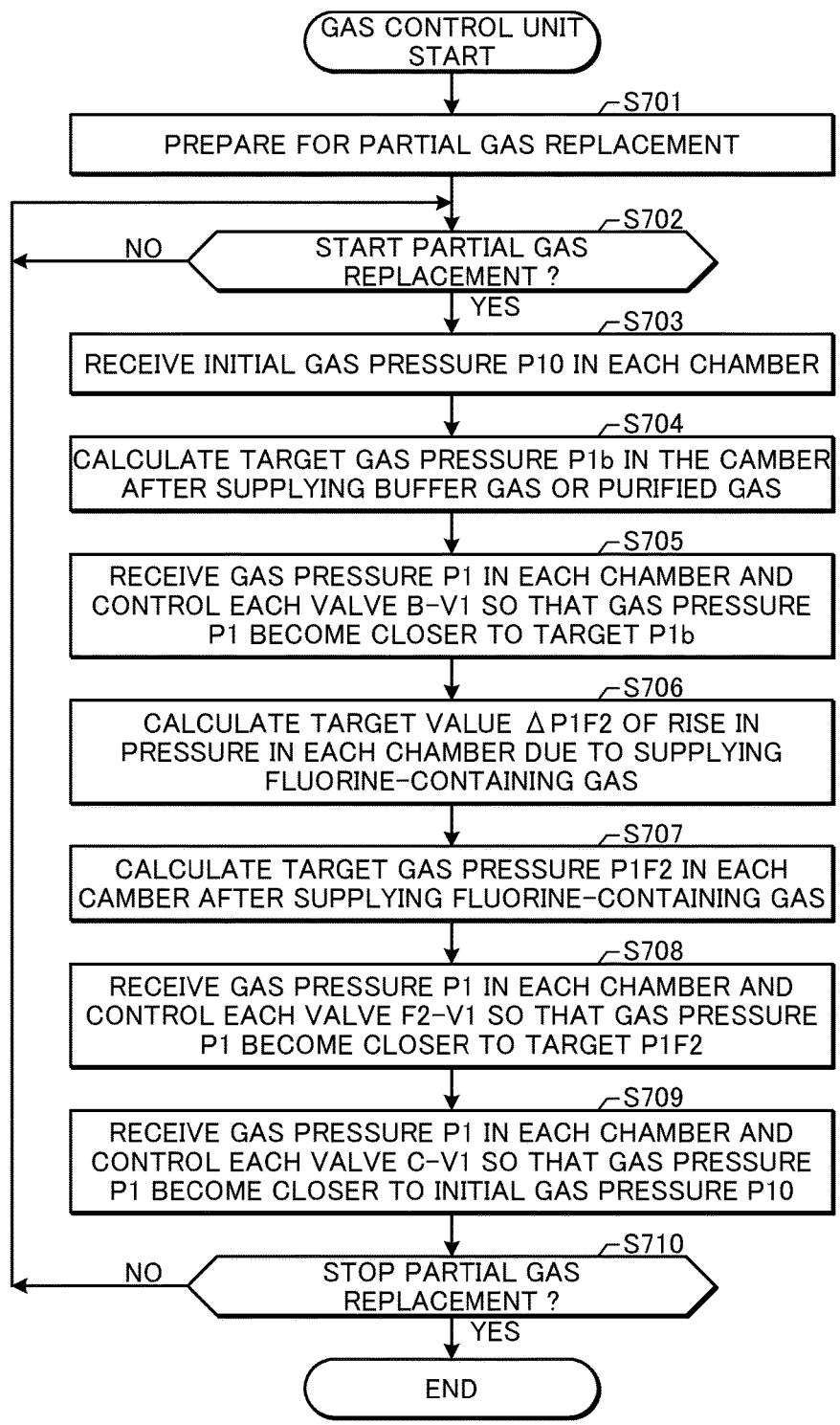
FIG. 11 is a diagram illustrating an example of operation of a gas control unit of the laser apparatus including the gas purification system according to the third embodiment of the present disclosure.

FIG. 11 is a diagram illustrating an example of operation of each gas control unit of the laser apparatus including the gas purification system according to the third embodiment of the present disclosure.

In step S701, each gas control unit 310 may make preparations for partial gas replacement. In preparation for partial gas replacement, the valve F2-V1 and valve B-V1 of each gas supply device 320, the valve Ex-V of each exhaust device 330, and each valve C-V1 may all be closed. In preparation for partial gas replacement, the exhaust pump 332 of each exhaust device 330 may be brought into operation.

In step S702, each gas control unit 310 may determine whether it has received, from the corresponding laser control unit 100, a signal for starting partial gas replacement. Each laser control unit 100 may send the signal for starting partial gas replacement to the corresponding gas control unit 310 based on a predetermined number of shots of laser oscillation, predetermined time intervals, and the like. In a case where each gas control unit 310 has received, from the corresponding laser control unit 100, the signal for starting partial gas replacement, the gas control unit 310 may proceed to step S703. In a case where each gas control unit 310 has not received, from the corresponding laser control unit 100, the signal for starting partial gas replacement, the gas control unit 310 may repeat step S702.

In step S703, each gas control unit 310 may receive an initial pressure P10 of the gas in the corresponding chamber 210 (i.e., a pressure of the gas in the corresponding chamber 210 before partial gas replacement) from the corresponding pressure sensor.

In step S704, each gas control unit 310 may calculate a target value P1$b$ of the pressure of the gas in the corresponding chamber 210 after supplying the buffer gas or the purified gas to the corresponding chamber 210.

In step S705, each gas control unit 310 may receive the pressure P1 of the gas in the corresponding chamber 210 from the corresponding pressure sensor and may control the corresponding valve B-V1 so that the pressure P1 may become closer to the target value P1$b$. At this point in time, in a case where the valve B-V2 is open and the valve C-V3 is closed, as described in the aforementioned step S603, the buffer gas may be supplied from the buffer gas supply source 3200 to each chamber 210. Alternatively, in a case where the valve B-V2 is closed and the valve C-V3 is open, as described in the aforementioned step S610, the purified gas may be supplied from the gas purification device 510 to each chamber 210. In this manner, each gas control unit 310 may cause the buffer gas or the purified gas to be supplied to the corresponding chamber 210.

In step S706, each gas control unit 310 may calculate a target value $\Delta$P1F2 of a rise in pressure in the corresponding chamber 210 due to supplying the fluorine-containing gas to the corresponding chamber 210. Each gas control unit 310 may calculate the target value $\Delta$P1F2 of the rise in pressure so that the concentration of a fluorine gas in the gas in the corresponding chamber 210 may become equal to a predetermined concentration CF2. For example, in a case where the fluorine-containing gas is a fluorine gas, the target value $\Delta$P1F2 of the rise in pressure may be calculated according to the formulae $\Delta$P1$b$=P1$b$−P10 and $\Delta$P1F2=CF2×$\Delta$P1$b$/(1−CF2). In a case where the fluorine-containing gas is a mixed gas, the calculation may be performed further in consideration of a mixing ratio of fluorine.

In step S707, each gas control unit 310 may calculate a target value P1F2 of the pressure of the gas in the corresponding chamber 210 after supplying the fluorine-containing gas to the corresponding chamber 210. The target value P1F2 of the pressure may be calculated according to the formula P1F2=P1$b$+$\Delta$P1F2.

In step S708, each gas control unit 310 may receive the pressure P1 of the gas in the corresponding chamber 210 from the corresponding pressure sensor and may control the corresponding valve F2-V1 so that the pressure P1 may become closer to the target value P1F2. In this manner, each gas control unit 310 may cause the fluorine-containing gas to be supplied to the corresponding chamber 210.

In step S709, each gas control unit 310 may receive the pressure P1 of the gas in the corresponding chamber 210 from the corresponding chamber pressure sensor 215 and may control the corresponding valve C-V1 so that the pressure P1 may become closer to the initial pressure P10. In this manner, each gas control unit 310 may introduce a part of the gas in the corresponding chamber 210 into the gas purification device 510.

In step S710, each gas control unit 310 may determine whether it has received, from the corresponding laser control unit 100, a signal for stopping partial gas replacement. Each laser control unit 100 may send the signal for stopping partial gas replacement to the corresponding gas control unit 310 based on the pressure P1 measured by the corresponding pressure sensor and the like. In a case where each gas control unit 310 has received, from the corresponding laser control unit 100, the signal for stopping partial gas replacement, the gas control unit 310 may terminate the operation of partial gas replacement. In a case where each gas control unit 310 has not received, from the corresponding laser control unit 100, the signal for stopping partial gas replacement, the gas control unit 310 may return to step S702.

Figure 12:
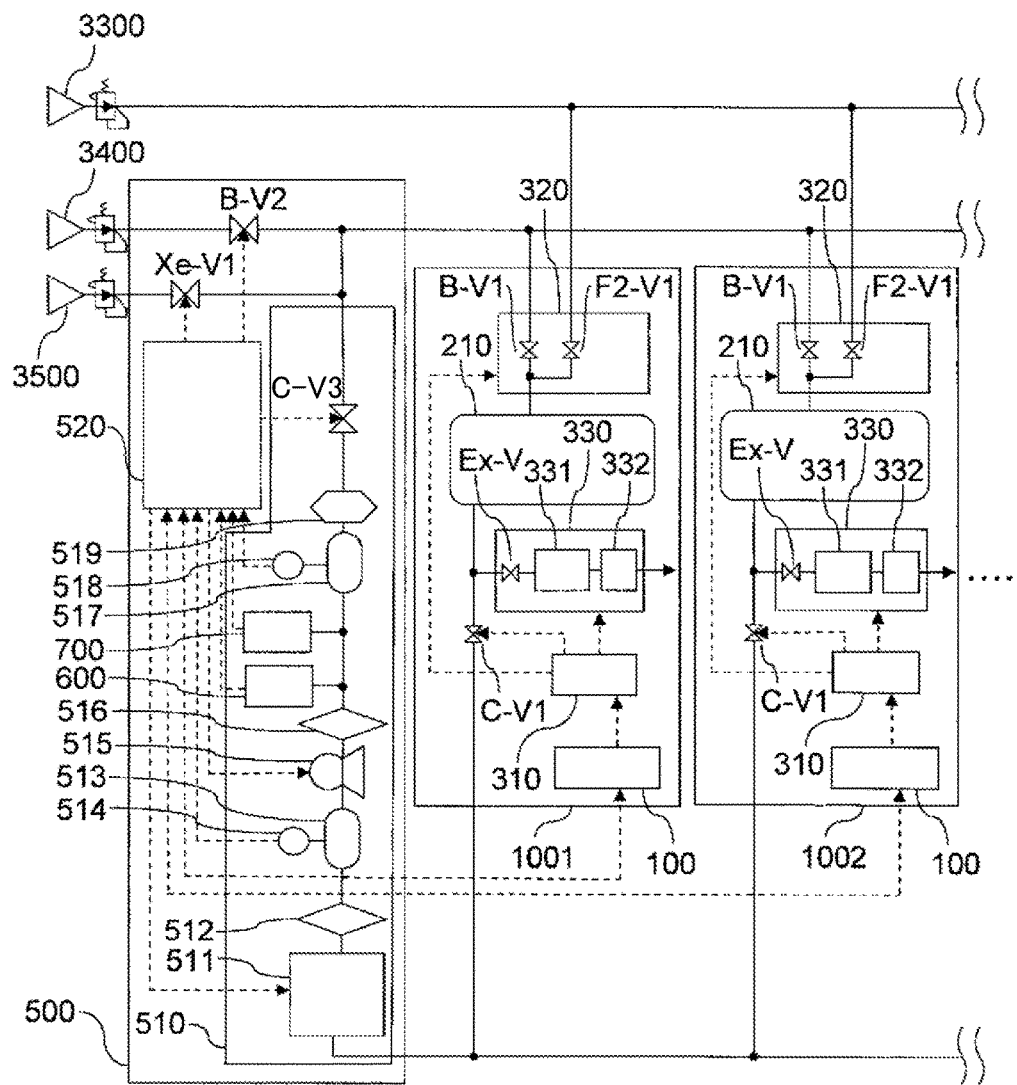
FIG. 12 is a diagram illustrating an example of a configuration of a laser apparatus including a gas purification system according to a fourth embodiment of the present disclosure.

3.4 Laser Apparatus Including Gas Purification System According to Fourth Embodiment of Present Disclosure FIG. 12 is a diagram illustrating an example of a configuration of a laser apparatus including a gas purification system according to a fourth embodiment of the present disclosure. The laser apparatus shown in FIG. 12 may include the same configuration as the laser apparatus illustrated in FIG. 9. Components of the laser apparatus illustrated in FIG. 12 which are identical to those of the laser apparatus illustrated in FIG. 9 are given the same reference signs, and as such, are omitted from the description below.

In the laser apparatus according to the fourth embodiment of the present disclosure, a gas supply source 3300 containing fluorine and a small amount of xenon may be used instead of the fluorine-containing gas supply source 3100. The gas supply source 3300 may supply a gas containing fluorine and a small amount of xenon to each chamber 210 through the corresponding gas supply device 320. The gas containing fluorine and a small amount of xenon may be a mixed gas of fluorine, argon, neon, and xenon. The gas containing fluorine and a small amount of xenon may be a mixed gas of fluorine, krypton, neon, and xenon.

In the laser apparatus according to the fourth embodiment of the present disclosure, a buffer gas supply source 3400 containing a small amount of xenon may be used instead of the buffer gas supply source 3200. The buffer gas supply source 3400 may supply a buffer gas containing a small amount of xenon to each chamber 210 through the corresponding gas supply device 320. The buffer gas containing a small amount of xenon may be a mixed gas of argon, neon, and xenon. The buffer gas containing a small amount of xenon may be a mixed gas of krypton, neon, and xenon.

Use of gasses containing small amounts of xenon such as the gas containing fluorine and a small amount of xenon and the buffer gas containing a small amount of xenon may stabilize discharge of a gas supplied between the pair of discharge electrodes in each chamber 210. The concentration of xenon in a gas containing a small amount of xenon may be approximately 10 ppm.

Meanwhile, xenon may produce $XeF_2$ by reacting with fluorine according to the formula $Xe+F_2 \rightarrow XeF_2$. $XeF_2$ produced by the reaction between xenon and fluorine may be adsorbed to a metal surface to reduce the concentration of xenon in the gas supplied to each chamber 210. Since the purification column 511, first filter 512, and second filter 516 of the gas purification system 500 have metal surfaces with larger surface areas, $XeF_2$ may be adsorbed to the purification column 511, the first filter 512, and the second filter 516. Such purification by the gas purification system 500 of a part of the gas supplied to each chamber 210 may reduce the concentration of xenon in the gas that is supplied to each chamber 210. A reduction in the concentration of xenon in the gas that is supplied to each chamber 210 may lead to a reduction in energy of initial pulse laser light during burst operation of the laser apparatus. The burst operation of the laser apparatus may be such that laser oscillation is executed at a predetermined repetition frequency and the stoppage of laser oscillation is repeated at predetermined time intervals.

In the laser apparatus according to the fourth embodiment of the present disclosure, a buffer gas supply source 3500 containing a large amount of xenon may further be used. The buffer gas supply source 3500 may supply a buffer gas containing a large amount of xenon to each chamber 210 through the corresponding gas supply device 320. The buffer gas containing a large amount of xenon may be a mixed gas of argon, neon, and xenon. The buffer gas containing a large amount of xenon may be a mixed gas of krypton, neon, and xenon.

The gas purification system 500 in the laser apparatus according to the fourth embodiment of the present disclosure may further include a valve Xe-V1. The valve Xe-V1 may be provided to supply the buffer gas containing a large amount of xenon from the buffer gas supply source 3500 containing a large amount of xenon to a pipe through which a purified gas is supplied from the gas purification system 500 to each gas supply device 320. The gas purification control unit 520 may send a signal to the valve Xe-V1, and the valve Xe-V1 may receive a signal from the gas purification control unit 520 and be controlled by the gas purification control unit 520.

The gas purification device 510 in the laser apparatus according to the fourth embodiment of the present disclosure may further include a xenon concentration meter 700. The xenon concentration meter 700 may be configured to measure the concentration of xenon in the gas purified by the gas purification system 500. The xenon concentration meter 700 may be a gas chromatograph mass spectrometer (GS-MS). The xenon concentration meter 700 may be configured to send the concentration of xenon in the purified gas to the gas purification control unit 520.

In the laser apparatus according to the fourth embodiment of the present disclosure, the gas purification control unit 520 may receive the concentration of xenon in the purified gas from the xenon concentration meter 700 as measured by the xenon concentration meter 700. The gas purification control unit 520 may control the opening and closing of the valve Xe-V1, depending on the concentration of xenon in the purified gas as measured by the xenon concentration meter 700. For example, in a case where the concentration of xenon in the purified gas is lower than a predetermined concentration, the valve Xe-V1 may be opened to supply the buffer gas containing a large amount of xenon so that the concentration of xenon in the purified gas may become equal to the predetermined concentration. In this manner, a reduction in the concentration of xenon in the purified gas may be suppressed. Energy of pulse laser light that is outputted from the laser apparatus according to the fourth embodiment of the present disclosure may be stabilized.

In the laser apparatus according to the fourth embodiment of the present disclosure, the concentration of xenon in the purified gas may be measured by the xenon concentration meter 700. However, changes in energy of pulse light that is outputted from each excimer laser apparatus during burst operation and changes in charging voltage Vhv that is supplied from each charger during burst operation may be monitored. A reduction in the concentration of xenon in the purified gas may be predicted from a relationship between the initial energy of pulse light that is outputted from each excimer laser apparatus during burst operation and the charging voltage that is applied from each charger during burst operation. The gas containing xenon may be supplied to the purified gas on the basis of the predicted reduction in xenon concentration.

Figure 13:
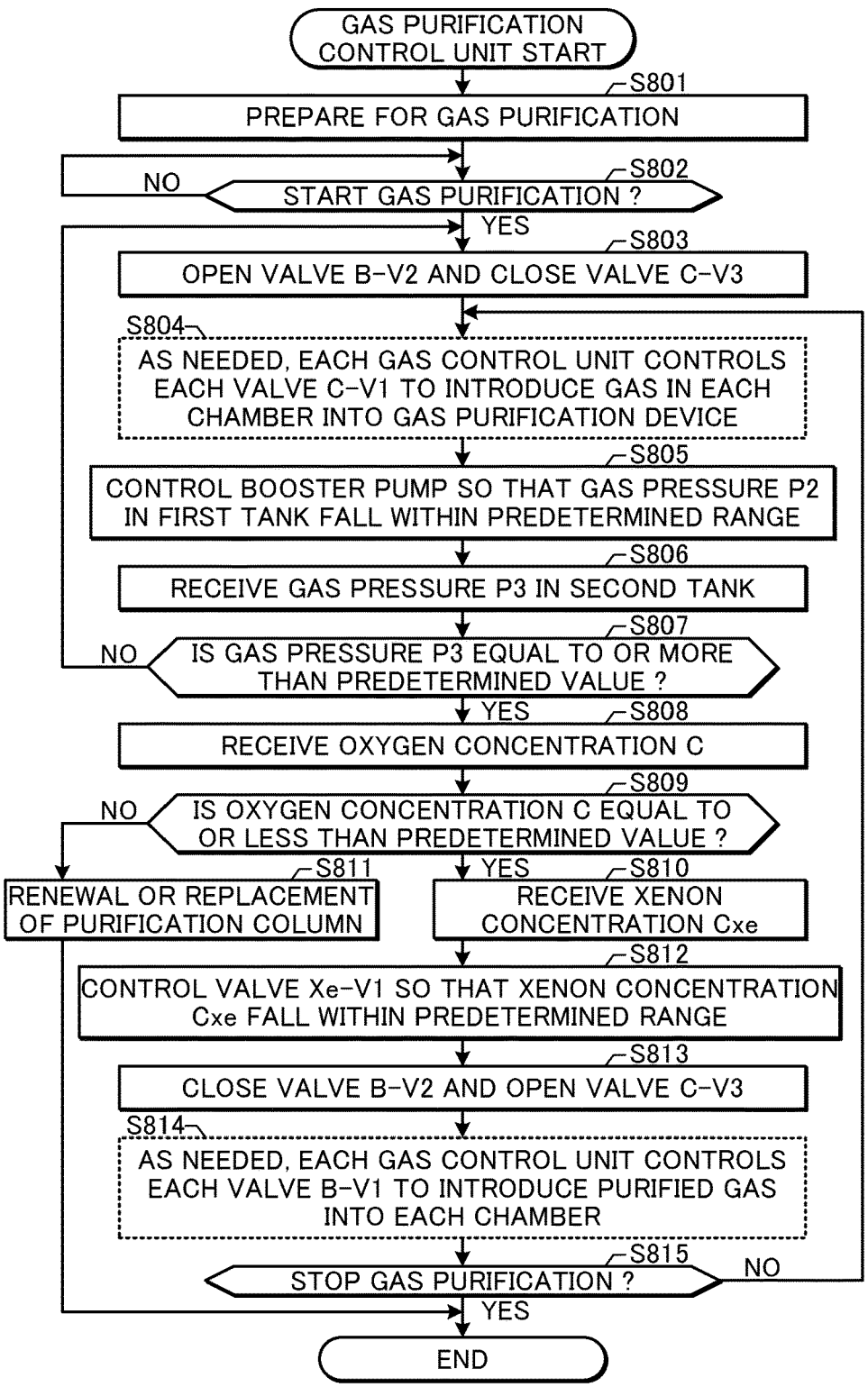
FIG. 13 is a diagram illustrating an example of operation of a gas purification control unit of the laser apparatus including the gas purification system according to the fourth embodiment of the present disclosure.

FIG. 13 is a diagram illustrating an example of operation of the gas purification control unit of the laser apparatus including the gas purification system according to the fourth embodiment of the present disclosure.

In step S801, the gas purification control unit 520 may make preparations for gas purification. In preparation for gas purification, the circulation gas pipe of the gas purification device 510 may be filled with a gas. In preparation for gas purification, the purification column 511 may be heated. In preparation for gas purification, the valves C-V1 and the valve C-V3 may be closed.

In step S802, the gas purification control unit 520 may determine whether it has received, from the laser control unit 100 of each excimer laser apparatus through the gas control unit 310 of that excimer laser apparatus, a signal for starting gas purification. Each laser control unit 100 may send the signal for starting gas purification to the gas purification control unit 520 through the corresponding gas control unit 310 based on the predetermined number of shots of laser oscillation, the predetermined time intervals, and the like. In a case where the gas purification control unit 520 has received, from each laser control unit 100 through the corresponding gas control unit 310, the signal for starting gas purification, the gas purification control unit 520 may proceed to step S803. In a case where the gas purification control unit 520 has not received, from each laser control unit 100 through the corresponding gas control unit 310, the signal for starting gas purification, the gas purification control unit 520 may repeat step S802.

In step S803, the gas purification control unit 520 may open the valve B-V2 and close the valve C-V3. In this manner, the gas purification control unit 520 may cause the buffer gas containing a small amount of xenon to be supplied from the buffer gas supply source 3400 containing a small amount of xenon to each chamber 210.

In step S804, each gas control unit 310 may as needed control the opening and closing of the corresponding valve C-V1 and thereby introduce the gas in the corresponding chamber 210 into the gas purification device 510. The gas in each chamber 210 which is introduced into the gas purification device 510 may be purified by the purification column 511 and the first filter 512 of the gas purification device 510. The gas thus purified may be supplied to the first tank 513 of the gas purification device 510.

In step S805, the gas purification control unit 520 may control the booster pump 515. The gas purification control unit 520 may receive a pressure P2 of the gas in the first tank 513 as measured by the first pressure sensor 514. The booster pump 515 may be controlled so that the pressure P2 of the gas in the first tank 513 may fall within a predetermined range of pressure. The booster pump 515 may be controlled so that the pressure P2 of the gas in the first tank 513 may satisfy P2min≤P2≤P2max. P2min may be the atmospheric pressure (1013 hPa). P2max may be a pressure (e.g., 1300 hPa) that is higher than the atmospheric pressure. The booster pump 515 may be configured to send the gas contained in the first tank 513 to the second tank 517. When the pressure P2 of the gas in the first tank 513 satisfies P2min≤P2, the booster pump 515 may more efficiently send the gas contained in the first tank 513 to the second tank 517. When the pressure P2 of the gas in the first tank 513 satisfies P2≤P2max, the booster pump 515 may more efficiently send a part of the gas in each chamber 210 to the first tank 513 of the gas purification device 510.

In step S806, the gas purification control unit 520 may receive a pressure P3 of the gas in the second tank 517 as measured by the second pressure sensor 518.

In step S807, the gas purification control unit 520 may determine whether the pressure P3 of the gas in the second tank 517 is equal to or higher than a predetermined pressure P3reg. The predetermined pressure P3reg may be a pressure (e.g., 5000 hPa or higher and 5700 hPa or lower) indicated by a regulator provided in a pipe through which the buffer gas is supplied. In a case where the pressure P3 of the gas in the second tank 517 is equal to or higher than the predetermined pressure P3reg, the gas purification control unit 520 may proceed to step S808. In a case where the pressure P3 of the gas in the second tank 517 is equal to or higher than the predetermined pressure P3reg, the gas in the second tank 517 may be more efficiently sent to each chamber 210. In a case where the pressure P3 of the gas in the second tank 517 is not equal to or higher than the predetermined pressure P3reg, the gas purification control unit 520 may return to step S803.

In step S808, the gas purification control unit 520 may receive, from the oximeter 600, an oxygen concentration C in a gas flowing through the circulation gas pipe of the gas purification device 510. The oxygen concentration C may be measured by the oximeter 600 of the gas purification control unit 520.

In step S809, the gas purification control unit 520 may determine whether the oxygen concentration C in the gas flowing through the circulation gas pipe of the gas purification device 510 is equal to or lower than a predetermined concentration Cmax. In a case where the oxygen concentration C in the gas flowing through the circulation gas pipe of the gas purification device 510 is equal to or lower than the predetermined concentration Cmax, the gas purification control unit 520 may proceed to step S810. In a case where the oxygen concentration C in the gas flowing through the circulation gas pipe of the gas purification device 510 is equal to or lower than the predetermined concentration Cmax, the purification column 511 may function normally. In a case where the oxygen concentration C in the gas flowing through the circulation gas pipe of the gas purification device 510 is not equal to or lower than the predetermined concentration Cmax, the gas purification control unit 520 may proceed to step S811. In a case where the oxygen concentration C in the gas flowing through the circulation gas pipe of the gas purification device 510 is not equal to or lower than the predetermined concentration Cmax, the purification column 511 may not necessarily function normally.

In step S810, the gas purification control unit 520 may receive, from the xenon concentration meter 700, a xenon concentration Cxe in a gas flowing through the circulation gas pipe of the gas purification device 510. The xenon concentration Cxe may be measured by the xenon concentration meter 700 of the gas purification control unit 520. The gas purification control unit 520 may proceed to step S812.

In step S811, the gas purification control unit 520 may output, to each laser control unit 100, a signal for renewal or replacement of the purification column 511 or a signal indicating that the purification of a gas by the purification column 511 is difficult or impossible. In step S811, renewal or replacement of the purification column 511 may be performed.

In step S812, the gas purification control unit 520 may control the valve Xe-V1. The valve Xe-V1 may be controlled so that the xenon concentration Cxe in the gas flowing through the circulation gas pipe of the gas purification device 510 may fall within a predetermined range.

In step S813, the gas purification control unit 520 may close the valve B-V2 and open the valve C-V3. In this manner, the gas purification control unit 520 may make preparations for the supply of the gas purified by the gas purification device 510 from the gas purification device 510 to each chamber 210.

In step S814, each gas control unit 310 may as needed control the opening and closing of the corresponding valve B-V1 and thereby introduce the gas purified by the gas purification device 510 into the corresponding chamber 210.

In step S815, the gas purification control unit 520 may determine whether it has received, from each laser control unit 100 through the corresponding gas control unit 310, a signal for stopping gas purification. Each laser control unit 100 may send the signal for stopping gas purification to the gas purification control unit 520 through the corresponding gas control unit 310 based on the pressure P1 measured by a chamber pressure sensor (not illustrated) and the like. In a case where the gas purification control unit 520 has received, from each laser control unit 100 through the corresponding gas control unit 310, the signal for stopping gas purification, the gas purification control unit 520 may terminate the operation of gas purification. In a case where the gas purification control unit 520 has not received, from each laser control unit 100 through the corresponding gas control unit 310, the signal for stopping gas purification, the gas purification control unit 520 may return to step S804.

Figure 14:
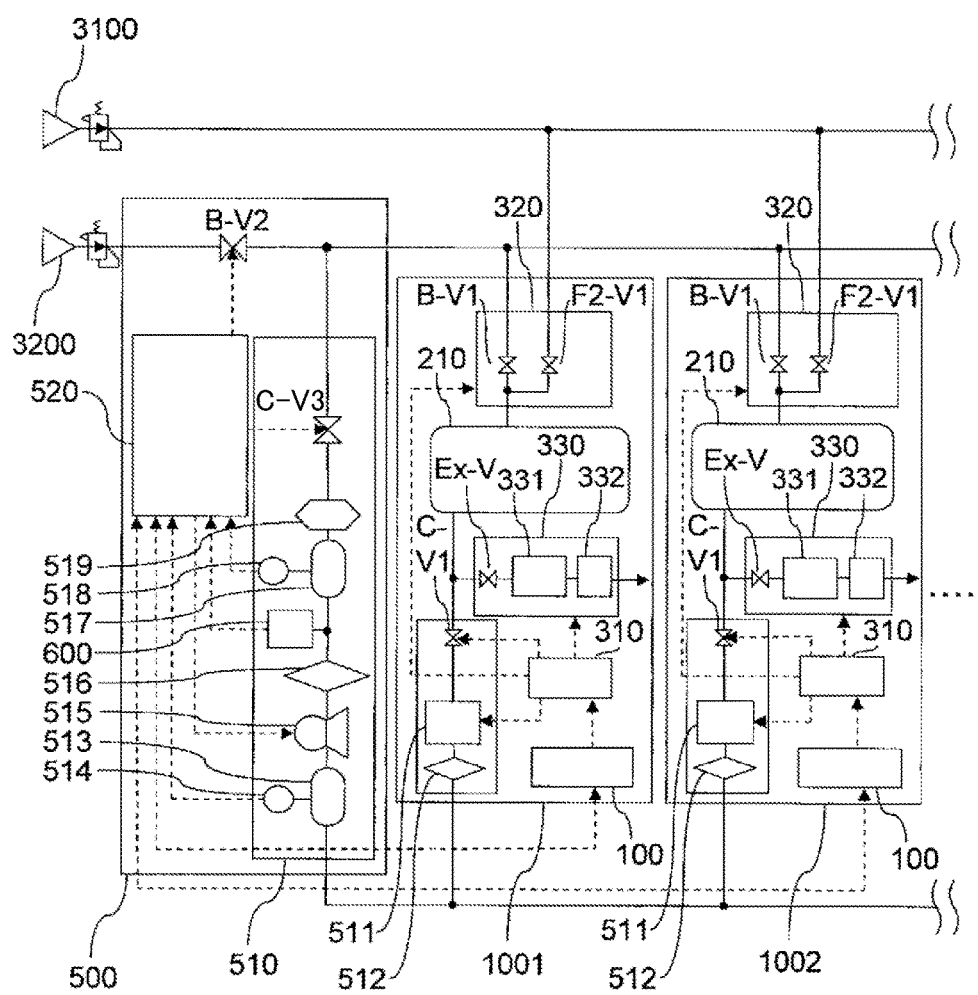
FIG. 14 is a diagram illustrating an example of a configuration of a laser apparatus including a gas purification system according to a fifth embodiment of the present disclosure.

3.5 Laser Apparatus Including Gas Purification System According to Fifth Embodiment of Present Disclosure FIG. 14 is a diagram illustrating an example of a configuration of a laser apparatus including a gas purification system according to a fifth embodiment of the present disclosure. The laser apparatus shown in FIG. 14 may include the same configuration as the laser apparatus illustrated in FIG. 9. Components of the laser apparatus illustrated in FIG. 14 which are identical to those of the laser apparatus illustrated in FIG. 9 are given the same reference signs, and as such, are omitted from the description below.

In the laser apparatus according to the fifth embodiment of the present disclosure, not the gas purification device 510 but each excimer laser apparatus may be provided with a purification column 511 and a first filter 512. Providing each excimer laser apparatus with the purification column 511 and the first filter 512 allows a purified gas to flow through a pipe between that excimer laser apparatus and the gas purification device 510.

Figure 15:
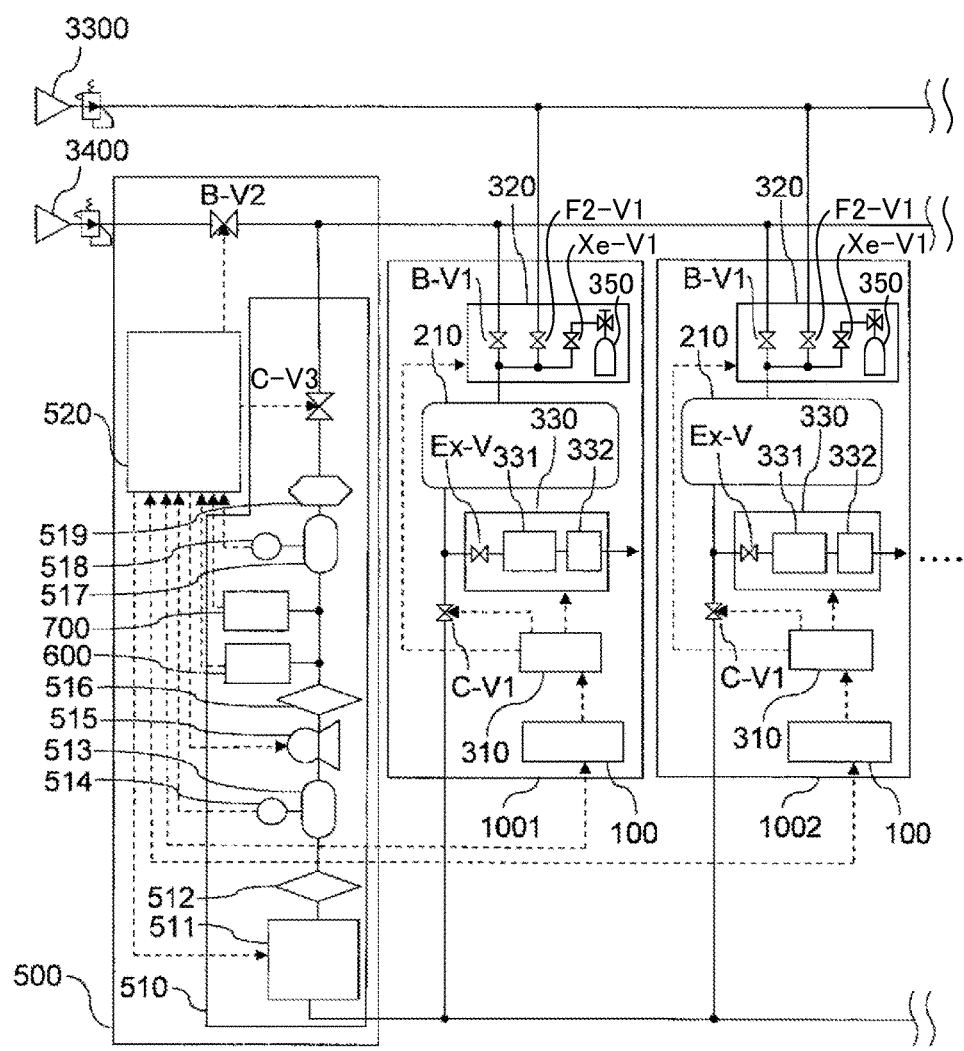
FIG. 15 is a diagram illustrating an example of a configuration of a laser apparatus including a gas purification system according to a sixth embodiment of the present disclosure.

3.6 Laser Apparatus Including Gas Purification System According to Sixth Embodiment of Present Disclosure FIG. 15 is a diagram illustrating an example of a configuration of a laser apparatus including a gas purification system according to a sixth embodiment of the present disclosure. The laser apparatus shown in FIG. 15 may include the same configuration as the laser apparatus illustrated in FIG. 12. Components of the laser apparatus illustrated in FIG. 15 which are identical to those of the laser apparatus illustrated in FIG. 12 are given the same reference signs, and as such, are omitted from the description below.

In the laser apparatus according to the sixth embodiment of the present disclosure, each gas supply device 320 may include a buffer gas cylinder 350 containing a large amount of xenon instead of the buffer gas supply source containing a large amount of xenon. The buffer gas cylinder 350 may supply a buffer gas containing a large amount of xenon to the corresponding chamber 210. The buffer gas cylinder 350 may be small in size, e.g., a cylinder of approximately 1 liter.

In the laser apparatus according to the sixth embodiment of the present disclosure, each gas supply device 320 may include a valve Xe-V1 instead of the valve Xe-V1 of the gas purification system 500. The valve Xe-V1 of each gas supply device 320 may be provided in a pipe connecting the corresponding buffer gas cylinder 350 and the corresponding chamber 210. The valve Xe-V1 may be controlled by the corresponding gas control unit 310.

FIGS. 16A to 16D are each a diagram for explaining a principle of estimation of a xenon concentration on the basis of changes in energy E of pulse light during burst operation in the laser apparatus including the gas purification system according to the sixth embodiment of the present disclosure.

Figure 16A:
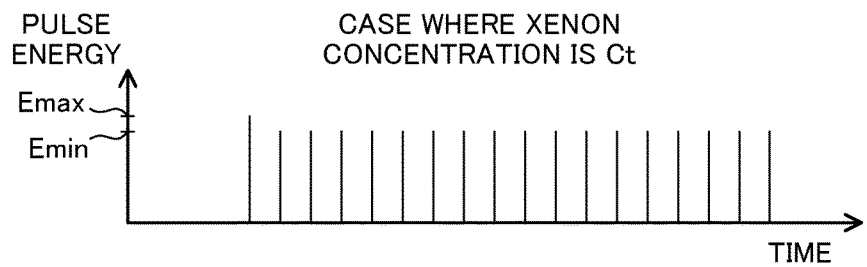
FIG. 16A is a diagram for explaining a principle of estimation of a xenon concentration on the basis of changes in energy E of pulse light during burst operation.

FIG. 16A shows changes in pulse energy E in the early phase of burst operation in a case where the xenon concentration is a concentration Ct that is close to an optimum value and the charging voltage V is constant. In a case where the xenon concentration is close to the optimum value, the stability of the pulse energy E may be high and the difference between the maximum value Emax of the pulse energy E and the minimum value Emin of the pulse energy E may be small.

Figure 16B:
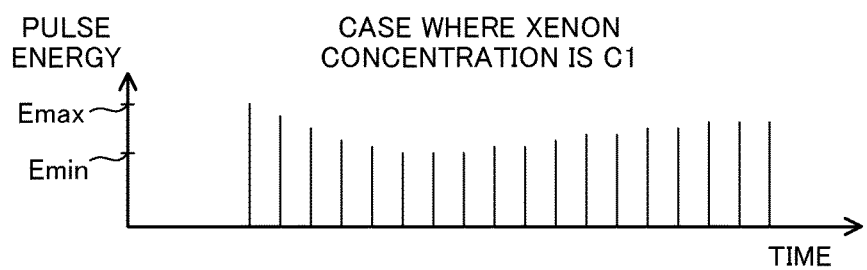
FIG. 16B is a diagram for explaining the principle of estimation of a xenon concentration on the basis of changes in energy E of pulse light during burst operation.

FIG. 16B shows changes in pulse energy E in the early phase of burst operation in a case where the xenon concentration is a concentration C1 that is lower than the optimum value and the charging voltage V is constant. When the xenon concentration is lower, the stability of the pulse energy E may be lower and the difference between the maximum value Emax of the pulse energy E and the minimum value Emin of the pulse energy E may be larger.

Figure 16C:
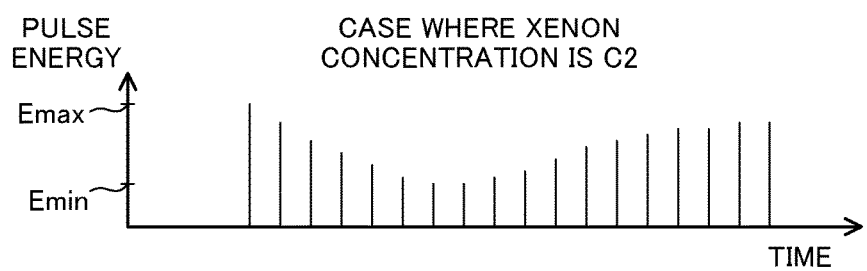
FIG. 16C is a diagram for explaining the principle of estimation of a xenon concentration on the basis of changes in energy E of pulse light during burst operation.

FIG. 16C shows changes in pulse energy E in the early phase of burst operation in a case where the xenon concentration is a concentration C2 that is even lower than the concentration C1 and the charging voltage V is constant. When the xenon concentration is even lower, the stability of the pulse energy E may be even lower and the difference between the maximum value Emax of the pulse energy E and the minimum value Emin of the pulse energy E may be even larger.

In this manner, the stability of the pulse energy E in the early phase of burst operation in a case where the charging voltage V is constant may be correlated with the xenon concentration.

Figure 16D:
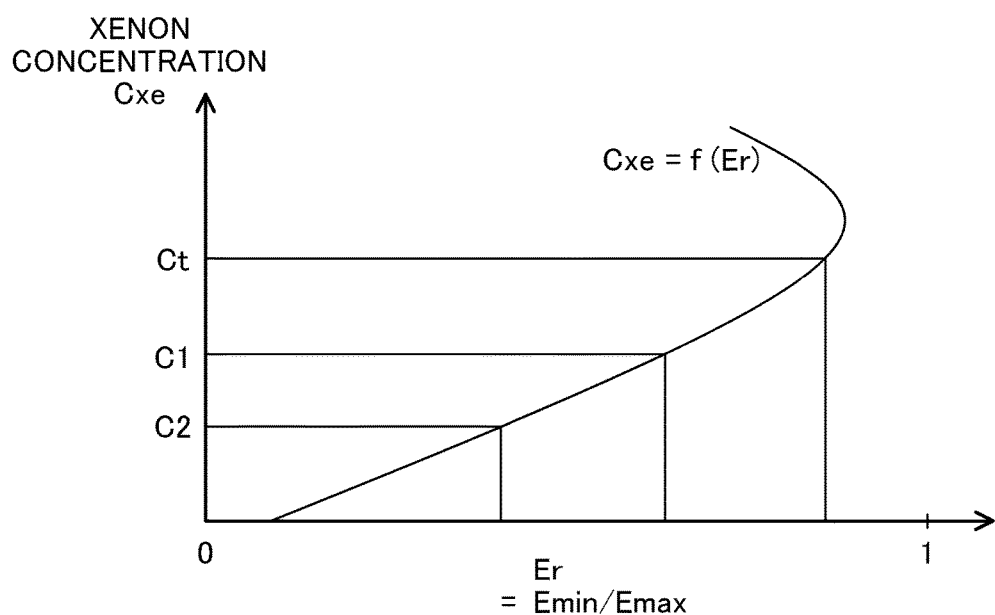
FIG. 16D is a diagram for explaining the principle of estimation of a xenon concentration on the basis of changes in energy E of pulse light during burst operation.

FIG. 16D shows a relationship between the stability of the pulse energy E in the early phase of burst operation and the xenon concentration Cxe in a case where the charging voltage V is constant. The stability of the pulse energy may be indicated by a ratio Er of the minimum value Emin to the maximum value Emax. The ratio Er is represented by the following formula:

$$Er = Emin/Emax$$

As shown in FIG. 16D, the xenon concentration Cxe may be expressed as a function f(Er) of the ratio Er, and this function may be stored. Use of the relationship between the ratio Er and the xenon concentration Cxe makes it possible to estimate the xenon concentration Cxe from the ratio Er without using a xenon concentration meter.

FIGS. 17A to 17D are each a diagram for explaining a principle of estimation of a xenon concentration on the basis of changes in charging voltage V by a charger during burst operation in the laser apparatus including the gas purification system according to the sixth embodiment of the present disclosure.

Figure 17A:
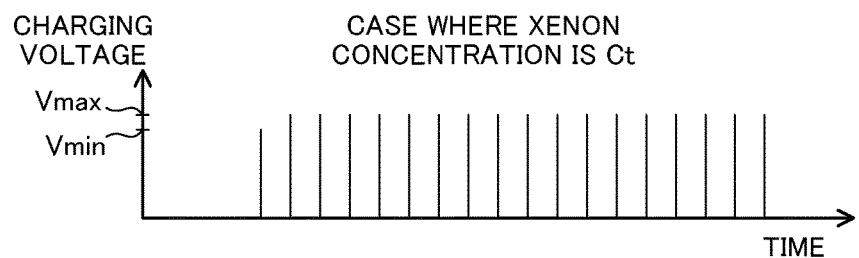
FIG. 17A is a diagram for explaining a principle of estimation of a xenon concentration on the basis of changes in charging voltage V due to a charger during burst operation.

FIG. 17A shows changes in charging voltage V in the early phase of burst operation in a case where the xenon concentration is a concentration Ct that is close to an optimum value and the pulse energy E is constant. In a case where the xenon concentration is close to the optimum value, the stability of the charging voltage V may be high and the difference between the maximum value Vmax of the charging voltage V and the minimum value Vmin of the charging voltage V may be small.

Figure 17B:
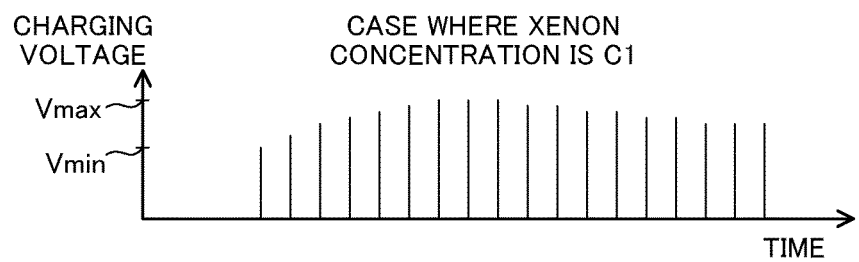
FIG. 17B is a diagram for explaining the principle of estimation of a xenon concentration on the basis of changes in charging voltage V due to a charger during burst operation.

FIG. 17B shows changes in charging voltage V in the early phase of burst operation in a case where the xenon concentration is a concentration C1 that is lower than the optimum value and the pulse energy E is constant. When the xenon concentration is lower, the stability of the charging voltage V may be lower and the difference between the maximum value Vmax of the charging voltage V and the minimum value Vmin of the charging voltage V may be larger.

Figure 17C:
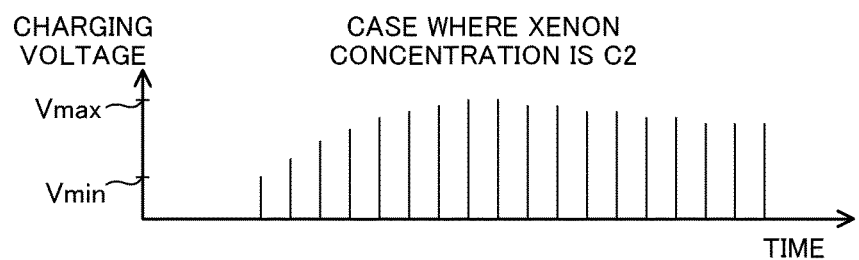
FIG. 17C is a diagram for explaining the principle of estimation of a xenon concentration on the basis of changes in charging voltage V due to a charger during burst operation.

FIG. 17C shows changes in charging voltage V in the early phase of burst operation in a case where the xenon concentration is a concentration C2 that is even lower than the concentration C1 and the pulse energy E is constant. When the xenon concentration is even lower, the stability of the charging voltage V may be even lower and the difference between the maximum value Vmax of the charging voltage V and the minimum value Vmin of the charging voltage V may be even larger.

In this manner, the stability of the charging voltage V in the early phase of burst operation in a case where the pulse energy E is constant may be correlated with the xenon concentration.

Figure 17D:
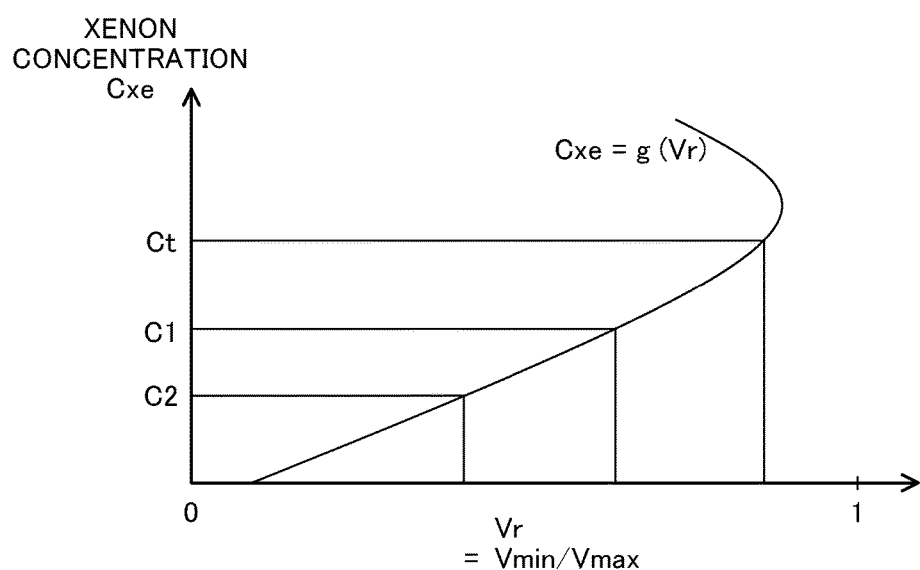
FIG. 17D is a diagram for explaining the principle of estimation of a xenon concentration on the basis of changes in charging voltage V due to a charger during burst operation.

FIG. 17D shows a relationship between the stability of the charging voltage V in the early phase of burst operation and the xenon concentration Cxe in a case where the pulse energy E is constant. The stability of the charging voltage V may be indicated by a ratio Vr of the minimum value Vmin to the maximum value Vmax. The ratio Vr is represented by the following formula:

$$Vr = Vmin/Vmax$$

As shown in FIG. 17D, the xenon concentration Cxe may be expressed as a function g(Vr) of the ratio Vr, and this function may be stored. Use of the relationship between the ratio Vr and the xenon concentration Cxe makes it possible to estimate the xenon concentration Cxe from the ratio Vr without using a xenon concentration meter.

Figure 18:
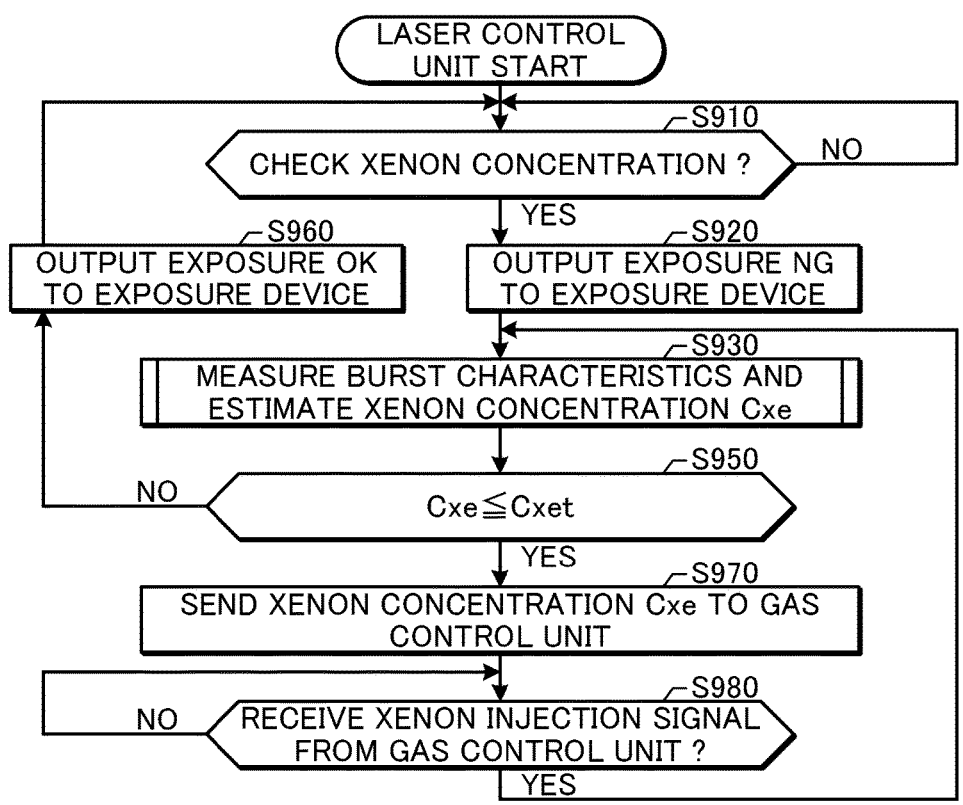
FIG. 18 is a diagram illustrating an example of operation of a laser control unit of the laser apparatus including the gas purification system according to the sixth embodiment of the present disclosure.

FIG. 18 is a diagram illustrating an example of operation of a laser control unit of the laser apparatus including the gas purification system according to the sixth embodiment of the present disclosure. The laser control unit 100 may estimate the xenon concentration Cxe through the following process. It should be noted the same process as that shown in FIG. 18 may be performed in the fourth embodiment.

In step S910, the laser control unit 100 may determine whether to check the xenon concentration. For example, the laser control unit 100 may determine to check the xenon concentration when a predetermined period of time has elapsed since it checked the xenon concentration last. In a case where the laser control unit 100 checks the xenon concentration, the laser control unit 100 may proceed to step S920. In a case where the laser control unit 100 does not check the xenon concentration, the laser control unit 100 may repeat step S910.

In step S920, the laser control unit 100 may output a signal representing exposure NG to the exposure device controller 2100 of the exposure device 2000. This may enable operation in such a burst pattern as to show the effect of a reduction in xenon concentration.

In step S930, the laser control unit 100 may estimate the xenon concentration Cxe by measuring burst characteristics. This process will be described in detail later with reference to FIGS. 20 and 21.

In step S950, the laser control unit 100 may determine whether the xenon concentration Cxe estimated in step S930 is equal to or lower than a predetermined threshold Cxet. In a case where the xenon concentration Cxe is not equal to or less than a predetermined threshold Cxet, the laser control unit 100 may proceed to step S960 in order to resume the exposure process. In a case where the xenon concentration Cxe is equal to or lower than the predetermined threshold Cxet, the laser control unit 100 may proceed to step S970 in order to cause the gas control unit 310 to execute xenon injection.

In step S960, the laser control unit 100 may output a signal representing exposure OK to the exposure device controller 2100 of the exposure device 2000. After step S960, the laser control unit 100 may return to step S910.

In step S970, the laser control unit 100 may send data representing the xenon concentration Cxe to the gas control unit 310. This may enable the gas control unit 310 to execute a process for xenon injection.

In step S980, the laser control unit 100 may determine whether it has received a xenon injection signal from the gas control unit 310. In a case where it has not received a xenon injection signal, the laser control unit 100 may repeat step S980. In a case where it has received a xenon injection signal, the laser control unit 100 may return to S930 in order to newly estimate a xenon concentration.

Figure 19:
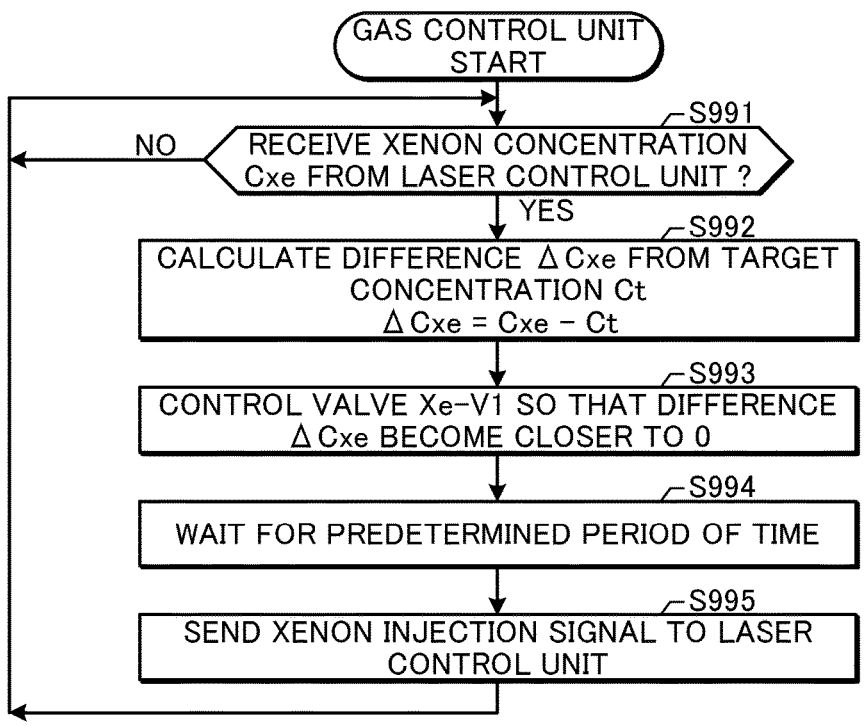
FIG. 19 is a diagram illustrating an example of operation of a gas control unit of the laser apparatus including the gas purification system according to the sixth embodiment of the present disclosure.

FIG. 19 is a diagram illustrating an example of operation of a gas control unit of the laser apparatus including the gas purification system according to the sixth embodiment of the present disclosure. The gas control unit 310 may control the valve Xe-V1 through the following process. It should be noted the same process as that shown in FIG. 19 may be performed by the gas purification control unit in the fourth embodiment.

In step S991, the gas control unit 310 may determine whether it has received data representing the xenon concentration Cxe from the laser control unit 100. The data representing the xenon concentration Cxe may be data that is sent from the laser control unit 100 in step S970 described with reference to FIG. 18. In a case where the gas control unit 310 has not received data representing the xenon concentration Cxe, the gas control unit 310 may repeat step S991. In a case where the gas control unit 310 has received data representing the xenon concentration Cxe, the gas control unit 310 may proceed to step S992.

In step S992, the gas control unit 310 may calculate the difference ΔCxe between the xenon concentration Cxe and the target concentration Ct according to the following formula:

$$\Delta Cxe = Cxe - Ct$$

The target concentration Ct may be a concentration that is close to the optimum value described with reference to FIG. 16A or 17A. The target concentration Ct may be a concentration that is higher than the threshold Cxet described with reference to FIG. 18.

In step S993, the gas control unit 310 may control the valve Xe-V1 so that the difference ΔCxe may become closer to 0. By controlling the valve Xe-V1, a small amount of a xenon gas may be supplied into the chamber.

In step S994, the gas control unit 310 may wait for a predetermined period of time. This predetermined period of time may be a period of time assumed as a period of time it takes to show the effect of xenon injection.

In step S995, the gas control unit 310 may send a xenon injection signal to the laser control unit 100. The xenon injection signal may be a signal that the laser control unit 100 receives in step S980 described with reference to FIG. 18. After step S995, the gas control unit 310 may return to step S991.

Figure 20:
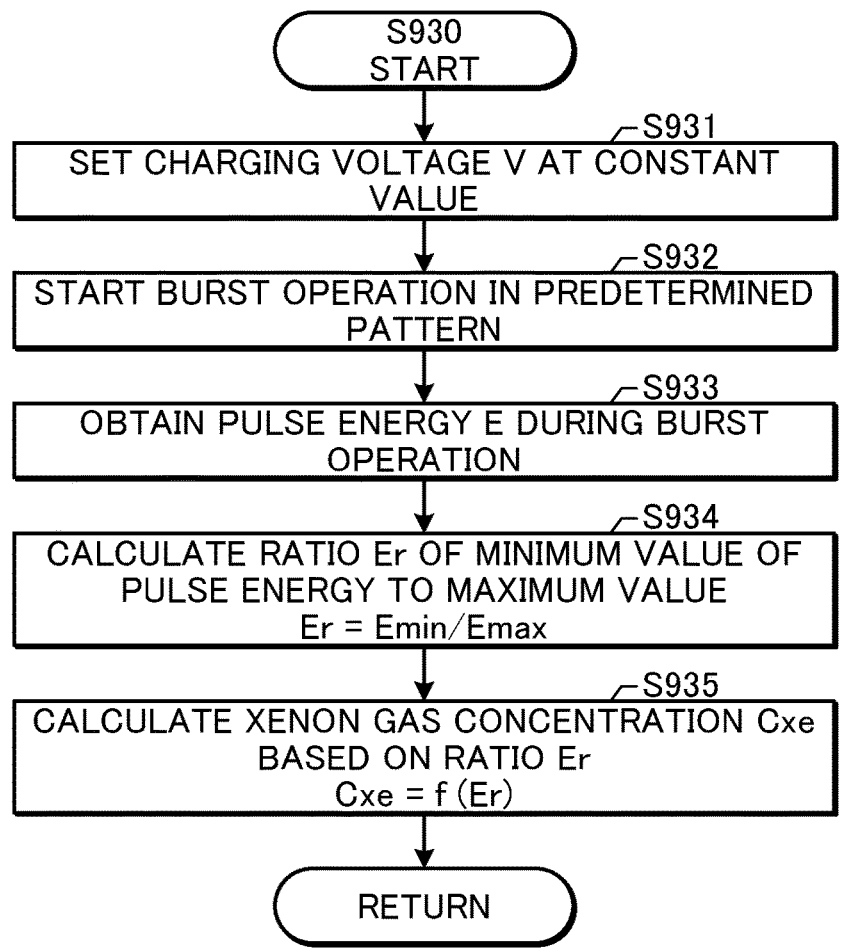
FIG. 20 is a diagram illustrating an example of operation in which the laser control unit of the laser apparatus including the gas purification system according to the sixth embodiment of the present disclosure estimates a xenon concentration Cxe.
Figure 21:
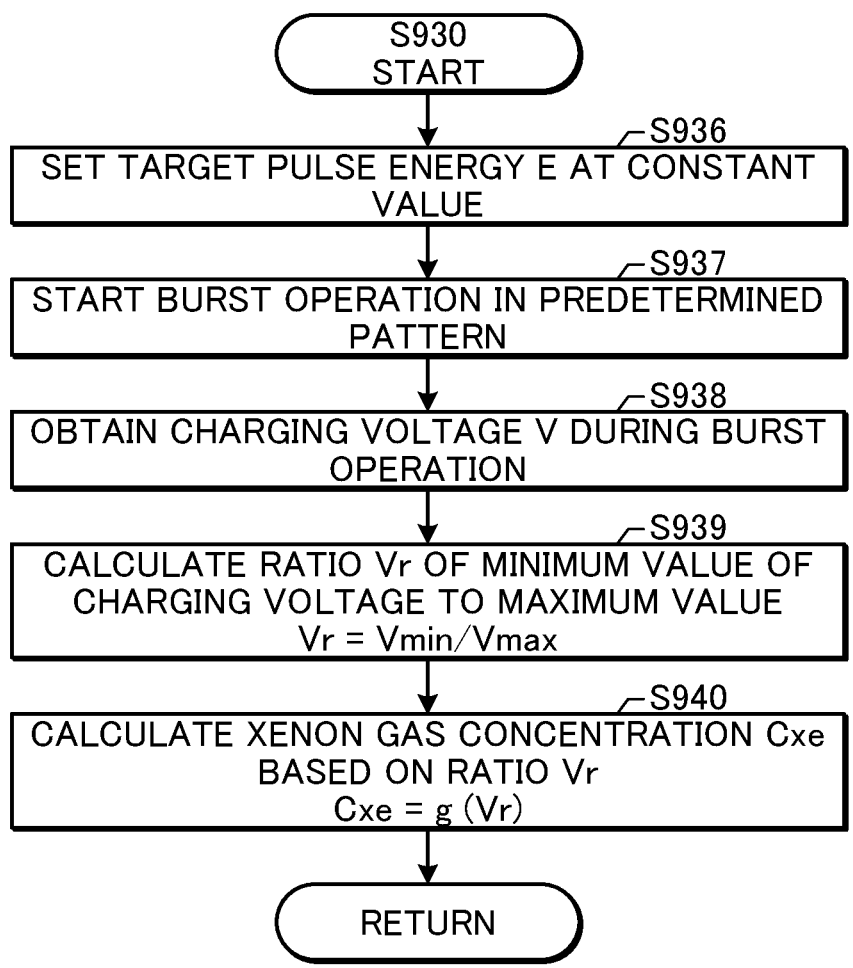
FIG. 21 is a diagram illustrating an example of operation in which the laser control unit of the laser apparatus including the gas purification system according to the sixth embodiment of the present disclosure estimates the xenon concentration Cxe.

FIGS. 20 and 21 are each a diagram illustrating an example of operation in which the laser control unit of the laser apparatus including the gas purification system according to the sixth embodiment of the present disclosure estimates the xenon concentration Cxe.

FIG. 20 shows a first example of an operation for estimating the xenon concentration Cxe on the basis of the stability of the pulse energy E. The operation shown in FIG. 20 may be performed by the laser control unit 100 as a subroutine of step S930 shown in FIG. 18.

In step S931, the laser control unit 100 may set the charging voltage V by the charger at a constant value.

In step S932, the laser control unit 100 may start burst operation in a predetermined pattern. The burst operation may include repetition of a trigger pattern including oscillation at a repetition frequency of 6 kHz for 1 second and then a pause for 1 second, for example, so as to easily show the effect of a reduction in xenon concentration.

In step S933, the laser control unit 100 may obtain data representing the pulse energy E during burst operation from the power monitor 220.

In step S934, the laser control unit 100 may calculate the ratio Er of the minimum value Emin of the pulse energy E to the maximum value Emax of the pulse energy E according to the following formula:

$$Er = Emin/Emax$$

In step S935, the laser control unit 100 may calculate the xenon gas concentration Cxe on the basis of the ratio Er of the minimum value Emin of the pulse energy E to the maximum value Emax of the pulse energy E.

After step S935, the laser control unit 100 may proceed to step S950 described with reference to FIG. 18.

FIG. 21 shows a second example of an operation for estimating the xenon concentration Cxe on the basis of the stability of the charging voltage V. The operation shown in FIG. 21 may be performed by the laser control unit 100 as a subroutine of step S930 shown in FIG. 18.

In step S936, the laser control unit 100 may set a target value of the pulse energy E at a constant value.

In step S937, the laser control unit 100 may start burst operation in a predetermined pattern. The burst operation may include repetition of a trigger pattern including oscillation at a repetition frequency of 6 kHz for 1 second and then a pause for 1 second, for example, so as to easily show the effect of a reduction in xenon concentration.

In step S938, the laser control unit 100 may obtain data representing the charging voltage V during burst operation.

In step S939, the laser control unit 100 may calculate the ratio Vr of the minimum value Vmin of the charging voltage V to the maximum value Vmax of the charging voltage V according to the following formula:

$$Vr = Vmin/Vmax$$

In step S940, the laser control unit 100 may calculate the xenon gas concentration Cxe on the basis of the ratio Vr of the minimum value Vmin of the charging voltage V to the maximum value Vmax of the charging voltage V.

After step S940, the laser control unit 100 may proceed to step S950 described with reference to FIG. 18.

In a case where, during the burst operation shown in FIGS. 17A, 17B, and 21, the charging voltage V is controlled so that an approximation to a predetermined pulse energy may be made and the xenon concentration is estimated on the basis of a change in charging voltage V at that time, the xenon concentration may be estimated during actual exposure. This eliminates the need to perform the process in steps S920 and S960 of FIG. 18.

Further, as shown in the graphs of FIGS. 16D and 17D, as the xenon concentration increases to go beyond the target concentration Ct, the Er and Vr values may reach the respective maximum values and then the Er and Vr values may decrease. In this case, the gas control unit may exhaust a part of the laser gas and inject a new laser gas so that the xenon concentration may become lower.

4. Controller According to Embodiment of Present Disclosure

Figure 22:
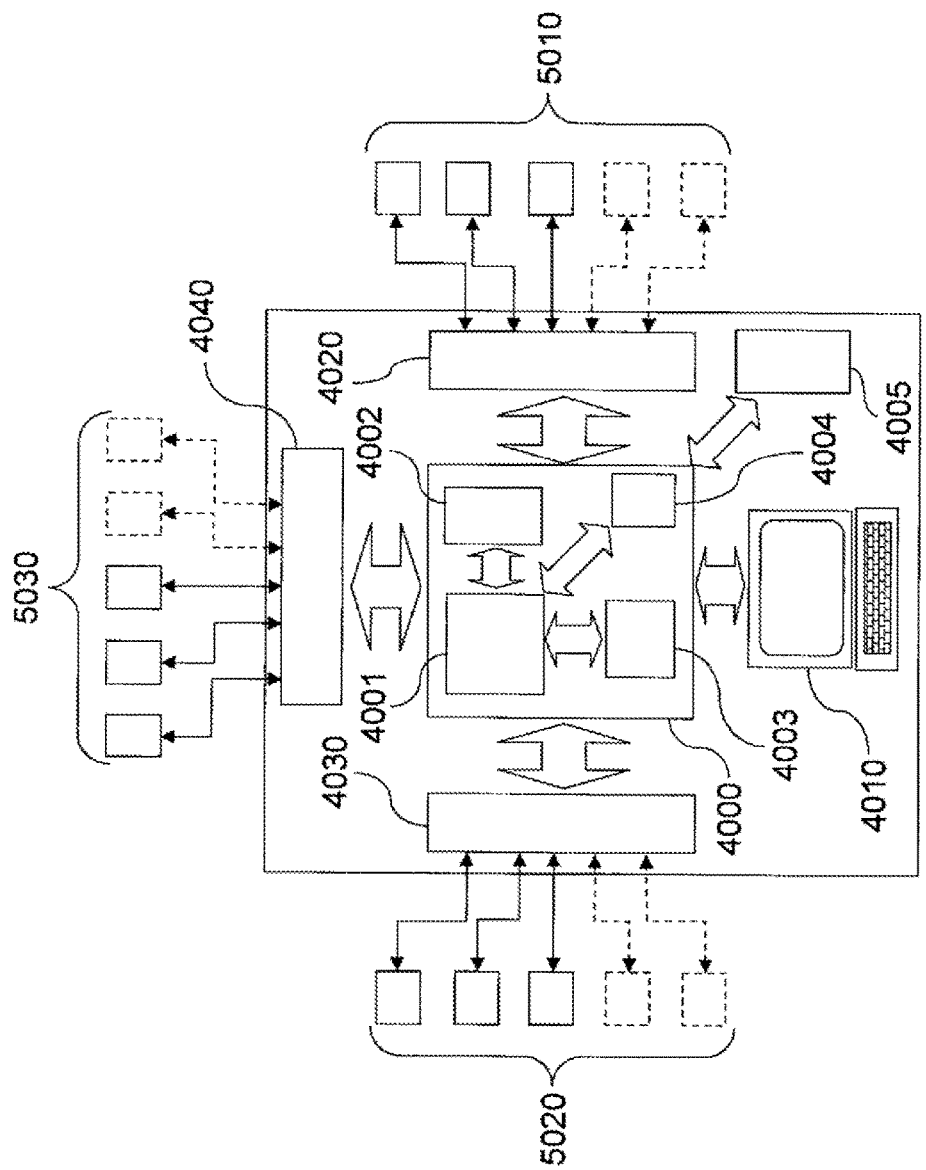
FIG. 22 is a diagram illustrating an example of a controller according to an embodiment of the present disclosure.

FIG. 22 is a diagram illustrating an example of a controller according to an embodiment of the present disclosure.

Each of the controllers in the above-described embodiments may be constituted by a general-purpose control device such as a computer or a programmable controller. For example, the controller may be constituted as described below.

(Configuration)

The controller may include a processing unit 4000, and a storage memory 4005, a user interface 4010, a parallel input/output (I/O) controller 4020, a serial I/O controller 4030, and an analog-to-digital (A/D) and digital-to-analog (D/A) converter 4040 that are connected to the processing unit 4000. The processing unit 4000 may include a central processing unit (CPU) 4001, and a memory 4002, a timer 4003, and a graphics processing unit (GPU) 4004 that are connected to the CPU 4001.

(Operation)

The processing unit 4000 may read out programs stored in the storage memory 4005. The processing unit 4000 may execute read-out programs, read out data from the storage memory 4005 in accordance with the execution of the programs, or store data in the storage memory 4005.

The parallel I/O controller 4020 may be connected to devices communicable through parallel I/O ports. The parallel I/O controller 4020 may control communication using digital signals through parallel I/O ports that is performed in the process where the processing unit 4000 executes programs.

The serial I/O controller 4030 may be connected to devices communicable through serial I/O ports. The serial I/O controller 4030 may control communication using digital signals through serial I/O ports that is performed in the process where the processing unit 4000 executes programs.

The A/D and D/A converter 4040 may be connected to devices communicable through analog ports. The A/D and D/A converter 4040 may control communication using analog signals through analog ports that is performed in the process where the processing unit 4000 executes programs.

The user interface 4010 may be configured to display progress of program execution by the processing unit 4000 to an operator or to receive instructions by the operator to the processing unit 4000 to stop execution of the programs or to execute interruption processing.

The CPU 4001 of the processing unit 4000 may perform arithmetic processing of programs. In the process where the CPU 4001 executes programs, the memory 4002 may temporally store programs or temporally store data in the arithmetic process. The timer 4003 may measure time or elapsed time to output the time or the elapsed time to the CPU 4001 in accordance with the execution of the programs. When image data is input to the processing unit 4000, the GPU 4004 may process the image data in accordance with the execution of the programs and output the results to the CPU 4001.

(Connected Devices)

The devices communicable through parallel I/O ports, which are connected to the parallel I/O controller 4020, may be parallel I/O devices 5010 such as the emission trigger Tr, the charger, the control valves, and the like.

The devices communicable through serial I/O ports, which are connected to the serial I/O controller 4030, may be serial I/O devices 5020 such as the laser control unit, the gas control unit, and the gas purification control unit.

The devices communicable through analog ports, which are connected to the A/D and D/A converter 4040, may be analog I/O devices 5030 such as the optical sensor 223 and a pressure sensor.

The aforementioned descriptions are intended to be taken only as examples, and are not to be seen as limiting in any way. Accordingly, it will be clear to those skilled in the art that variations on the embodiments of the present disclosure can be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the modifier "a" or "an" as used in the present specification and the scope of the appended claims should be interpreted as meaning "at least one" or "one or more".

REFERENCE SIGNS LIST

100 Laser control unit
200 Laser oscillation system
210 Chamber
211*a*, 211*b* Discharge electrode
212*a*, 212*b* Window
213 Pulse power module
214 Switch
215 Chamber pressure sensor
220 Power monitor
221 Beam splitter
222 Collector lens
223 Optical sensor
230 Charger
240 Output coupling mirror
250 Line narrow module
251 Prism
252 Grating
300 Gas control system
310 Gas control unit
320 Gas supply device
330 Exhaust device
331 Fluorine trap
332 Exhaust pump
400 Gas purification system
410 Gas purification device
411 Purification column
412 Filter
413 Circulation pump
414 Mass flow controller
420 Gas purification control unit
500 Gas purification system
510 Gas purification device
511 Purification column
512 First filter
513 First tank
514 First pressure sensor
515 Booster pump
516 Second filter
517 Second tank
518 Second pressure sensor
519 Purifier
520 Gas purification control unit
600 Oximeter
700 Xenon concentration meter
1000 Excimer laser apparatus
1001 First excimer laser apparatus
1002 Second excimer laser apparatus
2000 Exposure device
2100 Exposure device controller
3100 Fluorine-containing gas supply source
3200 Buffer gas supply source
3300 Gas supply source containing fluorine and a small amount of xenon
3400 Buffer gas supply source containing a small amount of xenon
3500 Buffer gas supply source containing a large amount of xenon
4000 Processing unit
4001 CPU
4002 Memory
4003 Timer
4004 GPU
4005 Storage memory
4010 User interface
4020 Parallel I/O controller
4030 Serial I/O controller
4040 A/D or D/A converter
5010 Parallel I/O device
5020 Serial I/O device
5030 Analog I/O device

The invention claimed is:

1. A gas laser apparatus comprising:

a first laser chamber connected through a first control valve to a first laser gas supply source that supplies a first laser gas containing a halogen gas and connected through a second control valve to a second laser gas supply source that supplies a second laser gas having a lower halogen gas concentration than the first laser gas;

a second laser chamber connected through a sixth control valve to the first laser gas supply source and connected through a seventh control valve to the second laser gas supply source;

a common pipe connected to the second laser gas supply source and divided into a first branch pipe in which the second control valve is disposed and a second branch pipe in which the seventh control valve is disposed;

a fourth control valve disposed in the common pipe;

a purification column that removes at least a part of the halogen gas and a halogen compound from at least a part of a gas exhausted from the first laser chamber and at least a part of a gas exhausted from the second laser chamber; and a booster pump, connected through a third control valve to the common pipe between the fourth control valve and a place where the common pipe is divided into the first and second branch pipes, the booster pump being configured to raise a pressure of a gas having passed through the purification column to a gas pressure that is higher than an operating gas pressure of the first laser chamber and an operating gas pressure of the second laser chamber.

2. The gas laser apparatus according to claim 1, further comprising a controller,
the controller being configured to calculate, on a basis of a first amount of a gas supplied from the booster pump through the third control valve and the second control valve to the first laser chamber, a second amount of the first laser gas that is to be supplied to the first laser chamber and control the first control valve on a basis of a result of the calculation of the second amount, and
the controller being configured to calculate, on a basis of a third amount of a gas supplied from the booster pump through the third control valve and the seventh control valve to the second laser chamber, a fourth amount of the first laser gas that is to be supplied to the second laser chamber and control the sixth control valve on a basis of a result of the calculation of the fourth amount.

3. The gas laser apparatus according to claim 1, further comprising:
a first tank disposed between the purification column and the booster pump;
a first pressure sensor that measures a first pressure inside the first tank;
a second tank disposed between the booster pump and the third control valve;
a second pressure sensor that measures a second pressure inside the second tank; and
a controller that controls the booster pump on a basis of the first pressure and controls the third control valve on a basis of the second pressure.

4. The gas laser apparatus according to claim 3, wherein the controller controls the booster pump so that the first pressure is equal to or higher than a first predetermined value and equal to or lower than a second predetermined value and permits the third control valve to open if the second pressure is equal to or higher than a third predetermined value.

5. The gas laser apparatus according to claim 1, further comprising:
a controller that selectively executes a first control mode in which the third control valve is closed and the fourth control valve is opened and a second control mode in which the fourth control valve is closed and the third control valve is opened.

6. The gas laser apparatus according to claim 5, further comprising:
a first tank disposed between the purification column and the booster pump;
a first pressure sensor that measures a first pressure inside the first tank;
a second tank disposed between the booster pump and the third control valve; and
a second pressure sensor that measures a second pressure inside the second tank,
wherein the controller controls the booster pump on a basis of the first pressure and controls the third control valve on a basis of the second pressure.

7. The gas laser apparatus according to claim 6, wherein the controller controls the booster pump so that the first pressure is equal to or higher than a first predetermined value and equal to or lower than a second predetermined value and permits the third control valve to open if the second pressure is equal to or higher than a third predetermined value.

8. The gas laser apparatus according to claim 1, wherein the first laser gas contains a fluorine gas, an argon gas, a neon gas, and a xenon gas, and
the second laser gas contains an argon gas, a neon gas, and a xenon gas.

9. The gas laser apparatus according to claim 8, wherein the first laser chamber and the second laser chamber are connected through a fifth control valve to a third laser gas supply source that supplies a third laser gas having a higher xenon gas concentration than the second laser gas.

10. The gas laser apparatus according to claim 9, further comprising:
a xenon concentration meter that measures a xenon gas concentration of the gas having passed through the purification column; and
a controller that controls the fifth control valve on a basis of the xenon gas concentration.

11. The gas laser apparatus according to claim 9, further comprising:
a first operating characteristic measuring instrument that measures a first operating characteristic of laser light that is outputted from the first laser chamber;
a second operating characteristic measuring instrument that measures a second operating characteristic of laser light that is outputted from the second laser chamber; and
a controller that controls the fifth control valve on a basis of the first operating characteristic and the second operating characteristic.

12. The gas laser apparatus according to claim 8, wherein the first laser chamber and the second laser chamber are connected through a fifth control valve and the common pipe to a third laser gas supply source that supplies a third laser gas having a higher xenon gas concentration than the second laser gas.

13. The gas laser apparatus according to claim 8, wherein the first laser chamber is connected through an eighth control valve to a fourth laser gas supply source that supplies a fourth laser gas having a higher xenon gas concentration than the second laser gas, and
the second laser chamber is connected through a ninth control valve to a fifth laser gas supply source that supplies a fifth laser gas having a higher xenon gas concentration than the second laser gas.

14. The gas laser apparatus according to claim 13, further comprising:
a first operating characteristic measuring instrument that measures a first operating characteristic of laser light that is outputted from the first laser chamber;
a second operating characteristic measuring instrument that measures a second operating characteristic of laser light that is outputted from the second laser chamber; and
a controller that controls the eighth control valve on a basis of the first operating characteristic and controls the ninth control valve on a basis of the second operating characteristic.

* * * * *